(12) United States Patent
Koseki

(10) Patent No.: US 7,948,533 B2
(45) Date of Patent: May 24, 2011

(54) SOLID STATE IMAGE SENSOR DEVICE HAVING SIGNAL NOISE REDUCTION CIRCUITRY

(75) Inventor: Ken Koseki, Kanagawa (JP)

(73) Assignee: Sony Corporation, Tokyo (JP)

( * ) Notice: Subject to any disclaimer, the term of this patent is extended or adjusted under 35 U.S.C. 154(b) by 726 days.

(21) Appl. No.: 11/895,556

(22) Filed: Aug. 24, 2007

(65) Prior Publication Data

US 2008/0055432 A1 Mar. 6, 2008

(30) Foreign Application Priority Data

Aug. 31, 2006 (JP) ................ P2006-234827

(51) Int. Cl.
*H04N 5/217* (2011.01)
*H04N 9/64* (2006.01)
*H04N 5/228* (2006.01)

(52) U.S. Cl. ............... 348/243; 348/241; 348/222.1

(58) Field of Classification Search ............ 348/241, 348/243
See application file for complete search history.

(56) References Cited

U.S. PATENT DOCUMENTS

| 6,433,822 B1* | 8/2002 | Clark et al. ............ 348/241 |
| 6,473,124 B1* | 10/2002 | Panicacci et al. ........ 348/241 |
| 6,995,346 B2* | 2/2006 | Johanneson et al. ...... 250/208.1 |
| 7,023,479 B2* | 4/2006 | Hiramatsu et al. ........ 348/243 |
| 7,113,212 B2* | 9/2006 | Yonemoto et al. ........ 348/302 |
| 2002/0003581 A1* | 1/2002 | Sato et al. ............ 348/333.11 |
| 2005/0140795 A1* | 6/2005 | Hisamatsu et al. ....... 348/222.1 |
| 2007/0052564 A1* | 3/2007 | Funakoshi et al. ........ 341/118 |

FOREIGN PATENT DOCUMENTS

| JP | 2005-167918 | 6/2005 |
| JP | 2005-323331 | 11/2005 |

* cited by examiner

*Primary Examiner* — Lin Ye
*Assistant Examiner* — Chia-Wei A Chen
(74) *Attorney, Agent, or Firm* — Robert J. Depke; Rockey, Depke & Lyons, LLC

(57) ABSTRACT

A solid-state image sensor includes a pixel array unit including a plurality of pixels arranged in the form of an array, column signal lines adapted to transmit pixel signals output from pixels in respective columns, a noise adding unit adapted to add temporally constant and two-dimensional spatially random noise to the pixel signals transmitted via the column signal lines, and an analog-to-digital converter adapted to convert a signal level and a reference level of each pixel signal including the noise added thereto by the noise adding unit.

6 Claims, 20 Drawing Sheets

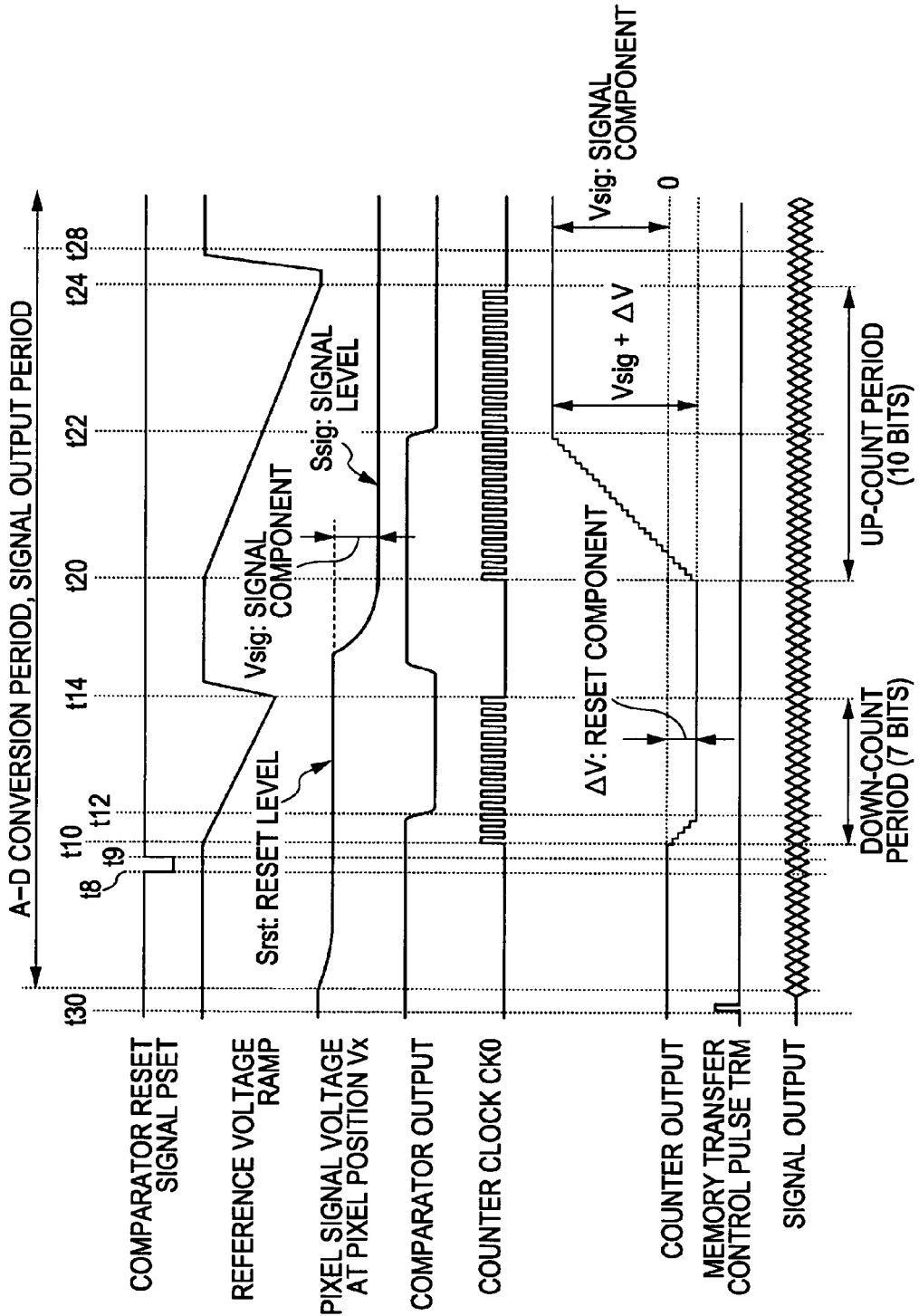

SOLID STATE IMAGE SENSOR DEVICE HAVING SIGNAL NOISE REDUCTION CIRCUITRY

CROSS REFERENCES TO RELATED APPLICATIONS

The present invention contains subject matter related to Japanese Patent Application JP 2006-234827 filed in the Japanese Patent Office on Aug. 31, 2006, the entire contents of which are incorporated herein by reference.

BACKGROUND OF THE INVENTION

1. Field of the Invention

The present invention relates to a solid-state image sensor which is a semiconductor device adapted to detect a physical quantity distribution, and to an image capturing apparatus using a solid-state image sensor. More particularly, the present invention relates to a mechanism of reading a physical quantity distribution output in the form of an analog electric signal from each of pixel cells which are sensitive to an electromagnetic wave such as light or radiation incident from the outside and which are arranged in the form of an array, and outputting the detected physical quantity distribution converted into the form of digital data to the outside.

2. Description of the Related Art

For example, in the technology of video devices, it is known to use a solid-state image sensor of a CCD (Charge Coupled Device) type or a MOS (Metal Oxide Semiconductor) or CMOS (Complementary Metal Oxide Semiconductor) type to detect physical quantity of light (which is one form of electromagnetic wave). In this type of solid-state image sensor, a physical quantity distribution is detected and converted into the form of an electric signal by pixel cells. Herein, the term "solid-state" is used to indicate that the device is made of semiconductor.

One type of solid-state image sensor is an active pixel sensor (also called a gain sensor) in which each pixel is configured such that a driving transistor for amplifying a pixel signal is provided in an pixel signal generator which generate the pixel signal corresponding to a signal charge generated by a charge generator. Most of MOS or CMOS-type solid-state image sensors use this configuration.

The CCD-type solid-state image sensor (hereinafter referred to as a CCD solid-state image sensor or more simply as a CCD image sensor) needs a special production process and needs a plurality of power supply voltage in operation. Besides, it is necessary to use a plurality of peripheral ICs (semiconductor Integrated Circuits) in operation, and thus a system is very complicated.

In contrast, the CMOS-type solid-state image sensor (hereafter referred to as a CMOS solid-state image sensor or a CMOS image sensor) has many advantages over the CCD image sensor. First, this type of solid-state image sensor can be produced using a production process very similar to that widely used over the world to produce CMOS semiconductor integrated circuits. Second, it can be driven using a single power supply. Third, analog circuits and logic circuits can be formed on the same single chip by using the CMOS production process, and thus it is possible to reduce the number of peripheral ICs.

Because of the above-described great advantages, much attention has been recently paid to CMOS image sensors.

In the active pixel sensor such as the CMOS image sensor, a pixel signal is read pixel by pixel from a plurality of pixels arranged in the form of an array such that a particular pixel is selected by specifying its address, and a signal is read from the selected pixel. In this sense, the active pixel sensor is an address control type solid-state image sensor.

For example, in a X-Y address control active pixel sensor in which pixel cells are arranged in the form of an array, each pixel has an amplification capability implemented by an amplifier such as a floating diffusion amplifier using an active element of a MOS structure (MOS transistor), whereby a signal charge (photoelectrons) accumulated in a photodiode serving as a photoelectric conversion element is amplified by the active element and the amplified signal is output as image information from a pixel array unit to a signal processing circuit connected to the pixel array unit.

In the operation, accumulation of the signal charge corresponding to incident light is performed line by line or pixel by pixel, and a current or voltage signal corresponding to the accumulated signal charge is sequentially read from the pixels by an address control scheme.

In most CCD image sensors, an output circuit is configured in the form of a 1-channel output circuit using a floating diffusion amplifier. In contrast, in CMOS image sensors, as described above, each pixel has an amplifier such as a floating diffusion amplifier, and pixel signals of the respective pixels are read from the pixel array unit, for example, on a row-by-row basis. More specifically, rows in the pixel array unit are selected one by one, and all pixels located in a selected row are simultaneously read in parallel. This signal outputting scheme is called a column parallel outputting scheme.

The parallel outputting scheme is needed because the amplifier disposed in each pixel does not have high enough driving capability to output a pixel signal in a short period, and the data rate at which the pixel signal is read out from one pixel is reduced by using the parallel outputting scheme.

In some solid-state image sensors, an analog image signal output from a pixel array unit is converted into digital data by an analog-to-digital converter, and resultant digital data is output to the outside.

In some column parallel output image sensors, the conversion of the image signal from analog form into digital form is also performed. As for the signal output circuit for this purpose, many types have been proposed. In an example of a most advance type, one analog-to-digital converter is provided for each column to convert a pixel signal into digital data (see, for example, Japanese Unexamined Patent Application Publication No. 2005-323331).

As for the analog-to-digital converter, various types are known depending on the conversion speed, the conversion resolution, the circuit complexity. In one type known as a single-slope integration or a ramp signal comparison analog-to-digital converter, an analog pixel signal is compared with a ramp-shaped reference signal, and a time spent to complete the comparison operation is counted. Digital data corresponding to the pixel signal is acquired on the basis of the count value obtained at a point of time at which the comparison is completed. This analog-to-digital conversion technique is also employed in the Japanese Unexamined Patent Application Publication No. 2005-323331.

SUMMARY OF THE INVENTION

In the parallel output configuration, signals output from pixels in the same column are processed by the same processing circuit. This can cause noise or variations having correlation with columns to appear. If these variations and noise are not suppressed to sufficiently low levels, column-correlated noise with a rather long period occurs. Hereinafter, such noise will be referred to as vertical streak noise.

In the technique disclosed in Japanese Unexamined Patent Application Publication No. 2005-323331, comparators (voltage comparators 252) are reset before the analog-to-digital conversion is performed to reduce variations in the reset level of the pixel signal and to remove the offset voltage of comparators. However, this does not necessarily eliminate completely all variations.

Examples of noise or variation which remains without being eliminated via the above-described process associated with the comparators include kTC noise which occurs when a comparator reset pulse is turned off, and column-to-column variations in inversion speed of comparator. The column-correlated variation in the inversion speed is a major cause of vertical streak noise which appears in an image of a signal component when the signal is produced such that a reset level and a signal level are converted into digital data, and the difference between these two digital data is extracted. The mechanism of occurrence of such noise will be discussed in further detail later.

In view of the above, it is desirable to provide a technique to suppress vertical streak noise appearing, due to column-correlated variations or noise occurring in the analog-to-digital conversion process, in an image obtained as a result of the analog-to-digital conversion of the signal.

More particularly, it is desirable to provide a technique to suppress vertical streak noise appearing in an image obtained as a result of the analog-to-digital conversion of the signal, due to column-correlated variations or noise occurring in an analog-to-digital converter and related circuits when the analog-to-digital converter used is of the single-slope integration type.

According to an embodiment of the present invention, there is provided a solid-state image sensor including a pixel array unit including a plurality of pixels arranged in the form of an array, column signal lines adapted to transmit pixel signals output from pixels in respective columns, a noise adding unit adapted to add temporally constant and two-dimensional spatially random noise to the pixel signals transmitted via the column signal lines, and an analog-to-digital converter adapted to convert a signal level and a reference level of each pixel signal including the noise added thereto by the noise adding unit.

In a state in which temporally constant and two-dimensional spatially random noise is added, if the reference level and the signal level are separately converted into digital data, then an influence of the noise appears in both resultant digital data. The digital data obtained as the result of the analog-to-digital conversion includes two-dimensional spatially random noise, and column-correlated noise disappears.

When the difference is extracted between the digital data obtained as the result of the analog-to-digital conversion of the reference level and the digital data obtained as the result of the analog-to-digital conversion of the signal level, the added noise is cancelled out and disappears, although quantization errors occur because the difference extraction process is performed in the digital domain. Note that quantization errors generated in the difference extraction process do not have a correlation with columns.

BRIEF DESCRIPTION OF THE DRAWINGS

FIG. 4 is a timing chart associated with a signal acquisition process and a difference extraction process performed by a column analog-to-digital converter in a solid-state image sensor;

DESCRIPTION OF THE PREFERRED EMBODIMENTS

The present invention is described in further detail below with reference to specific embodiments in conjunction with the accompanying drawings. In embodiments described below, by way of example, the invention is applied to a CMOS solid-state image sensor which is one of X-Y addressing solid-state image sensors. It is also assumed in the following discussion that all pixels of the CMOS solid-state image sensor have an NMOS configuration.

Note that the solid-state image sensor according to embodiments is not limited to the MOS type solid-state image sensor. Any of the embodiments described below may be applied to any semiconductor device for detecting a physical quantity distribution, including a plurality of pixel cells arranged in the form of a linear array or two-dimensional array so as to be sensitive to an electromagnetic wave such as light or radiation incident from the outside.

Overview of Solid-State Image Sensor

Figure 1:
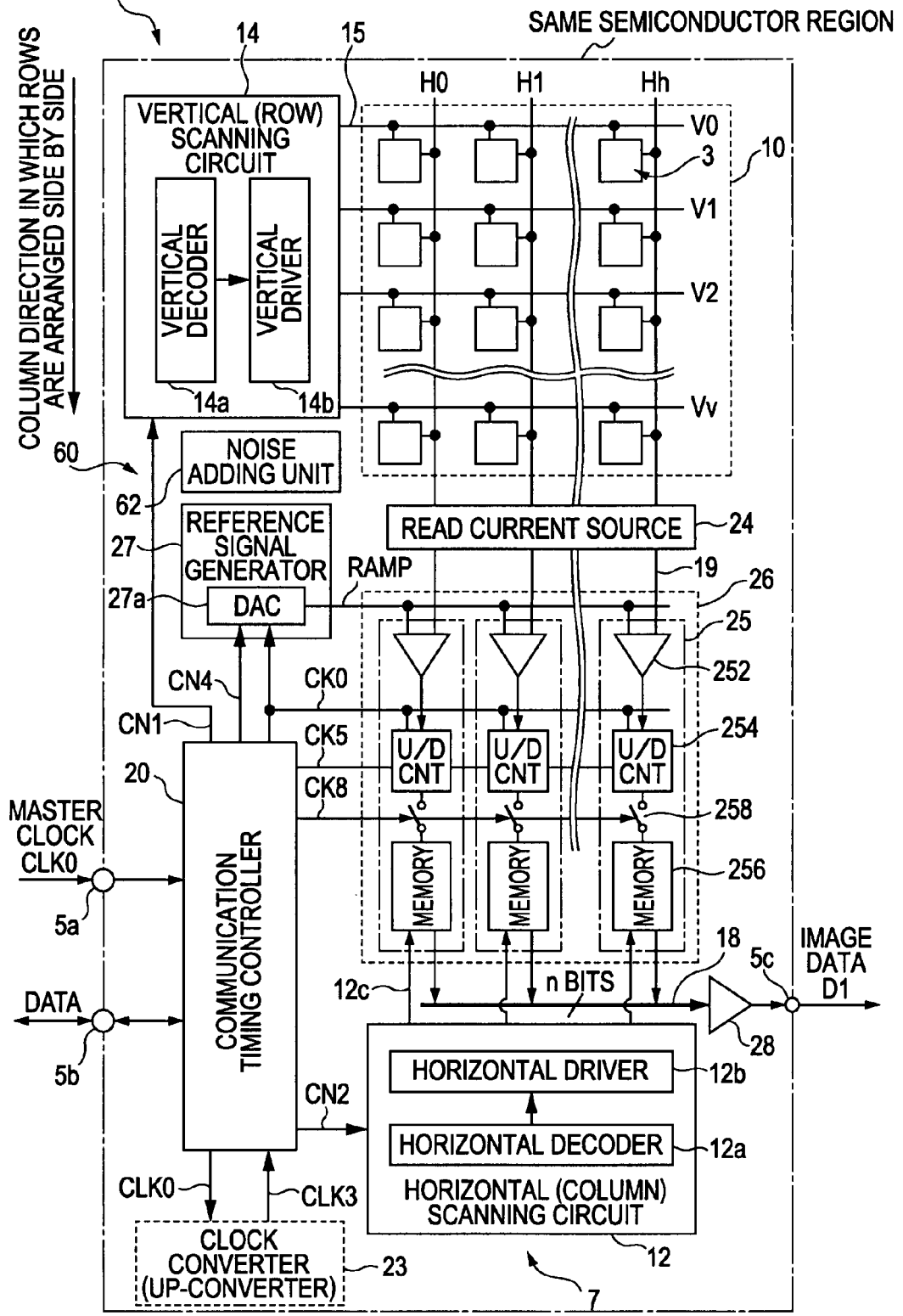
FIG. 1 is a diagram schematically illustrating a CMOS solid-state image sensor which is an example of a solid-state image sensor according to an embodiment of the present invention.

FIG. 1 schematically illustrates a CMOS solid-state image sensor (CMOS image sensor) which is an example of a solid-state image sensor according to an embodiment of the present invention.

The solid-state image sensor 1 includes a pixel array unit including a plurality of pixels arranged along rows and columns (in the form of a two-dimensional array). Each pixel includes a photosensor (which is an example of a charge generator) adapted to output a signal corresponding to an amount of incident light. The signal detected by each pixel is output in the form of a voltage signal. The solid-state image sensor 1 also includes CDS (Correlated Double Sampling) processing units and analog-to-digital converters (ADCs) which are disposed in parallel for respective columns.

More specifically, a plurality of CDS processing units and analog-to-digital converters are disposed in substantially parallel to the respective vertical signal lines (column signal lines) 19.

The plurality of functional parts may be disposed in an area (lower area in the example shown in FIG. 1) at one end of the column direction in the pixel array unit 10, as seen from the above. Alternatively, the plurality of functional parts may be divided into two groups, and one group may be disposed in an area at one end (lower end in FIG. 1) of the column direction, and the other group may be disposed in an area at the other end (upper end in FIG. 1) of the column direction in the pixel array unit 10. In the latter case, it is desirable that a horizontal scanning unit for performing reading and scanning (horizontal scanning) in the row direction be also divided into two groups, and respectively disposed in two end areas so that two groups operate independently.

In a typical example of a column parallel arrangement in which CDS processing units and analog-to-digital converters are disposed for respective columns, one CDS processing unit and one analog-to-digital converter are disposed for each column in a column area on an output end side of an image sensor unit such that signals are output via the CDS processing units and the analog-to-digital converters. Instead of the column type (column parallel type) described above, CDS processing units and analog-to-digital converters may be disposed such that one CDS processing unit and one analog-to-digital converter are assigned to each predetermined number of (for example two) adjacent vertical signal lines (vertical columns) 19, or such that one CDS processing unit and one analog-to-digital converter are assigned to each N vertical signal lines (vertical columns) 19 located apart from each other via N−1 vertical lines.

In configurations other than the column type, one CDS processing unit and one analog-to-digital converter are shaped by a plurality of vertical signal lines (vertical columns) 19, and pixel signals of a plurality of columns supplied from the pixel array unit 10 are sequentially switched via a switch and supplied to corresponding one CDS processing unit and one analog-to-digital converter. Depending on the process performed in a following stage, a memory is disposed to store the output signal.

Because signals output from pixels are processed by CDS processing units and analog-to-digital converters disposed for respective vertical signal lines (vertical columns) 19, each pixel cell can be configured in a simple form compared with a pixel cell configuration including a part for processing a signal inside the pixel cell. Thus, it is possible to place a greater number of pixels and reduce the size of cost of the image sensor.

Provision of a plurality of signal processing units disposed for respective columns makes it possible to process pixel signals in one row in parallel. In this configuration, each signal processing unit is allowed to operate at a lower speed than is required for a configuration in which pixel signals are processed sequentially by one CDS processing unit and one analog-to-digital converter disposed in an output area or disposed outside the device. This feature provides advantages in terms of the power consumption, the band width, noise, etc. In other words, it is possible to increase the operating speed of the sensor while maintaining the power consumption or the band width.

In addition to the advantages in terms of operating speed, power consumption, band width, and noise, the column-type configuration also has an advantage that no switching circuit is needed. In the embodiments described below, it is assumed that the column-type configuration is employed unless otherwise described.

As shown in FIG. 1, the solid-state image sensor 1 according to the present embodiment includes a pixel array unit 10 including a plurality of pixel cells 3 arranged along rows and along columns in the form of an array, a drive controller 7 disposed outside the pixel array unit 10, a read current source 24 adapted to supply an operating current (read current) for use in reading a pixel signal to the pixel cell 3 in the pixel array unit 10, a column processing unit 26 including column analog-to-digital converters 25 disposed for respective vertical columns, a reference signal generator 27 adapted to supply a reference signal RAMP for use in an analog-to-digital conversion process to the column processing unit 26, and an output unit 29. Note that these functional units described above are formed on the same single semiconductor substrate.

In the present embodiment, the column analog-to-digital converter 25 has a function of separately converting a reset level Srst serving as a reference level of the pixel signal So and a signal level Ssig into digital data. The column analog-to-digital converter 25 also has a function of extracting the difference between a result of analog-to-digital conversion for the reset level Srst and a result of analog-to-digital conversion for the signal level Ssig thereby acquiring digital data corresponding to a signal component represented by the difference between the reset level Srst and the signal level Ssig.

The solid-state image sensor 1 according to the present embodiment also includes a noise adding unit 62 adapted to add noise to the pixel signal to reduce the vertical streak noise. The noise adding unit 62 is a part essential to the present embodiment. A vertical streak noise reduction unit 60 is formed by the noise adding unit 62 and the functional part, in the column analog-to-digital converter 25, adapted to determine the difference between the reset level and the signal level of the pixel signal.

Although details of the noise adding unit 62 are not described herein, the noise adding unit 62 adds a noise signal, which does not change with time but which changes depending on pixel positions in two-dimensional space, to the pixel signal So supplied from the pixel array unit 10 to the column processing unit 26, by changing the timing of turning on/off the driving pulses applied to the pixel cells 3 and the operating timing of the analog-to-digital conversion (more specifically, the timing of releasing the reset of the comparator) or by changing the bias current (the read current supplied to the pixel cells 3) supplied via the vertical signal lines 19.

If time-varying noise is added to the pixel signal, it is very difficult to remove the added noise. However, two-dimensionally varying random noise which does not change temporally (hereinafter, such noise will also be referred to simply as two-dimensional spatial noise) can be removed by determining the difference between the signal level and the reset level for the pixel signal at the same pixel location.

At a stage before or after the column processing unit 26, an AGC (Automatic Gain Control) circuit or the like for amplifying the signal may be disposed, as required, in the same semiconductor region as that in which the column processing unit 26 is formed. When the AGC circuit is disposed before the column processing unit 26, the AGC circuit is configured to function as an analog amplifier. Conversely, when the AGC circuit is disposed after the column processing unit 26, the AGC circuit is configured to function as a digital amplifier. If n-bit digital data is simply amplified, degradation in halftone can occur. To avoid the above problem, it is desirable to dispose the AGC circuit before the column processing unit 26 so that an analog signal is first amplified by the AGC circuit and then is subjected to the analog-to-digital conversion.

The drive controller 7 has control circuits for sequentially reading signals from the pixel array unit 10. More specifically, for example, the drive controller 7 includes a horizontal scanning circuit (column scanning circuit) 12 functioning to control a column address and column scanning, a vertical scanning circuit (row scanning circuit) 14 functioning to control a row address and row scanning, and a communication/timing controller 20 functioning to generate an internal clock signal.

The drive controller 7 may further include a clock converter 23 which is drawn in a broken-line box close to the communication/timing controller 20 in FIG. 1, and which functions as a high-frequency clock generator adapted to generate a pulse at a clock frequency higher than the clock frequency of a clock signal input to the clock converter 23. The communication/timing controller 20 generates the internal clock signal in accordance with an input clock signal (master clock signal) CLK0 input via a terminal 5a or the high-frequency clock signal generated by the clock converter 23.

By using signals based on the high-frequency clock signals generated by the clock converter 23, it becomes possible to perform processing such as an analog-to-digital conversion at a high speed. Use of the high-frequency clock signal also makes it possible to perform motion extraction, compression, and other processes which need high-speed calculations. The high-frequency clock signal is also used when parallel data output from the column processing unit 26 is converted into serial data and output as image data D1 to the outside of the device. This makes it possible to output data at a high rate via a smaller number of terminals than the number of bits of digital data given as a result of the analog-to-digital conversion.

The clock converter 23 includes an up-converter adapted to generate a clock pulse at a frequency higher than the frequency of the input clock pulse. More specifically, the clock converter 23 receives a low-frequency clock pulse CLK2 from the communication/timing controller 20 and generates, from the received clock pulse, a clock pulse with a frequency two or more times higher than the frequency of the received clock pulse. The up-converter of the clock converter 23 may be implemented using one of various known circuits so as to generate an output signal with a frequency k1 times higher than the frequency of the low-frequency clock pulse CLK2 where k1 is an integer.

In FIG. 1, for simplicity, not all rows and columns are shown but only some of them are shown. Actually, as many as several ten to several thousand pixel cells 3 are arranged in each row and also in each column. Each pixel cell 3 typically includes a photodiode serving as a photosensor (charge generator) and an in-pixel amplifier including a semiconductor device (such as a transistor) for amplification.

The in-pixel amplifier may be implemented, for example, in the configuration of a floating diffusion amplifier. Each pixel cell may be implemented, for example, in a 4-transistor configuration widely employed in a CMOS sensor. This configuration includes a read selection transistor functioning as a charge reading unit (a transfer/read gate) for reading a signal charge from a charge generator, a reset transistor functioning as a reset gate, a vertical selection transistor, and a source follower amplification transistor functioning as a detection element to detect a change in potential of the floating diffusion region.

Alternatively, as disclosed in Japanese Examined Patent Application Publication No. 2708455, the in-pixel amplifier may be configured using three transistors, i.e., an amplifier transistor connected to a drain line (DRN) and functioning to amplify a signal voltage corresponding to a signal charge generated by a charge generator, a reset transistor for resetting the charge generator, and a read selection transistor (transfer gate) scanned by a vertical shift register via a transfer line (TRF).

In the solid-state image sensor 1, the pixel array unit 10 can be configured to function as a color image sensor by using color separation filters. More specifically, a color separation filter including filters with a plurality of different colors is disposed in the form of a Bayer arrangement or the like on the pixel array unit 10 so that a light incidence surface of each charge generator (implemented by, for example, a photodiode), on which an electromagnetic wave (light in the present embodiment) is incident, is covered with a color filter with one of the plurality of colors.

Each pixel cell 3 is connected to the vertical scanning unit 14 for selecting a row via one of row control lines 15, and also connected via one of the vertical signal lines 19 to the column processing unit 26 including column analog-to-digital converters 25 disposed separately for respective vertical columns. Note that in FIG. 1, a plurality of control lines extending from the vertical scanning unit 14 to pixels are generically represented as row control lines 15.

The horizontal scanning circuit 12 serves as a scan-and-read unit adapted to read a count value from the column processing unit 26.

All elements such as the horizontal scanning unit 12, the vertical scanning circuit 14, etc. in the drive controller 7 are integrally formed together with the pixel array unit 10 in a semiconductor region of single-crystal silicon or the like using technology similar to semiconductor integrated circuit fabrication technology, so as to form the solid-state image sensor.

The solid-state image sensor 1 may be configured in the form of a single chip in which all elements are integrally formed in a semiconductor region as with the example described above, or may be configured in the form of a module in which the pixel array unit 10 (the image sensor unit), various signal processing units such as the column processing unit 26, the reference signal generator 27, etc. and/or the optical system are disposed together in a package.

The horizontal scanning unit 12 and the vertical scanning unit 14 each include a decoder and operate such that a shifting operation (scanning operation) is started in response to a control signal CN1 or CN2 supplied from the communication/timing controller 20. For the above purpose, various kinds of pulse signals (such as a pixel reset pulse RST, a transfer pulse TRG, a DRN control pulse DRN, etc.) are transmitted over the row control lines 15 to drive the respective pixel cells 3.

The communication/timing controller 20 includes a functional block serving as a timing generator TG (which is an example of a read address controller) adapted to generate clock pulse signals for controlling various parts, and a functional block serving as a communication interface adapted to receive a master clock CLK0 via the terminal 5a or data DATA specifying an operation mode via the terminal 5b, and to output data from the solid-state image sensor 1.

More specifically, for example, the communication/timing controller 20 supplies a horizontal address signal to a horizontal decoder 12a and a vertical address signal to a vertical decoder 14a. In response, the horizontal decoder 12a and the vertical decoder 14a select a row and a column according to the received address signals.

To read the pixel signals (pixel data) at a high speed, it is desirable that the pixel cells 3 arranged in the form of the two-dimensional array be accessed as follows. First, vertical scan-and-read is performed. In the vertical scan-and-read, pixels are accessed on a row-by-row basis (that is, all pixels in a selected row is accessed in parallel), and analog pixel signals generated by corresponding pixel signal generators 5 are read via corresponding vertical signal lines 19 in the column direction. In each period in which one row is selected, a horizontal scan-and-read is performed such that the pixel signals (digital pixel data in the present embodiment) are read from pixels located in the selected row. Instead of reading pixel signals by scanning the pixels in the above-described manner, a pixel signal may be read from a particular pixel cell 3 by directly specifying an address thereof. This reading mode is called random access reading.

The communication/timing controller 20 generates various clock signals including a clock CLK1 with the same frequency as the frequency of the master clock CLK0 input via the terminal 5a, a clock with a frequency one-half the frequency of the master clock CLK0, and clocks with a further lower frequency, and the communication/timing controller 20 supplies these clock signals to various parts such as the horizontal scanning unit 12, the vertical scanning unit 14, and the column processing unit 26. Hereinafter, the clock with the frequency one-half the frequency of the master clock CLK0 and the clocks with further lower frequencies will be generically referred to as low-frequency clock pulses CLK2.

The vertical scanning unit 14 selects a row of the pixel array unit 10 and supplies a necessary pulse to the selected row. For the above purpose, the vertical scanning unit 14 includes a vertical decoder 14a adapted to specify one of rows arranged side by side in a vertical direction in the pixel array unit 10, and a vertical drive unit 14b adapted to supply a pulse, via a row control line 15, to pixel cells 3 on the row specified by the vertical decoder 14a. In addition to the row selection in the signal reading operation, the vertical decoder 14a also performs a row selection operation in an electronic shuttering operation.

The horizontal scanning unit 12 sequentially selects column analog-to-digital converters 25 in the column processing unit 26 in synchronization with the low-frequency clock pulse CLK2 so that a signal from each column analog-to-digital converter 25 is output over a horizontal signal line (horizontal output line) 18. For the above purpose, the horizontal scanning unit 12 includes a horizontal decoder 12a for specifying one of columns (that is, for selecting one of column analog-to-digital converters 25 in the column processing unit 26) arranged side by side in a horizontal direction, and a horizontal drive unit 12b adapted to read out signals from the column processing unit 26 over the horizontal signal bus 18 in accordance with read addresses defined in the horizontal decoder 12a. Note that there are as many horizontal signal lines 18 as the number of bits, n, (n is an integer) of data handled by the column analog-to-digital converters 25. For example, when 10-bit data is treated (that is, when n=10), 10 horizontal signal lines 18 are disposed.

In the solid-state image sensor 1 configured in the above-described manner, pixel signals output from the pixel cells 3 are supplied on a column-by-column basis to the column analog-to-digital converters 25 in the column processing unit 26 via the vertical signal lines 19.

Each column analog-to-digital converter 25 of the column processing unit 26 receives an analog signal So output from pixels located on a corresponding column, and processes the received analog signal So. Each column analog-to-digital converter 25 includes an ADC (Analog Digital Converter) circuit adapted to convert the analog signal into, for example, a 10-bit digital signal in synchronization with, for example, the low-frequency clock pulse CLK2.

In the column processing unit 26, the analog-to-digital conversion process is performed such that analog signals are held on a row-by-row basis, and the analog signals of respective columns in one row are converted into digital data by the respective column analog-to-digital converters 25 disposed for the respective columns. The analog-to-digital conversion is performed using a single-slope integration (ramp signal comparison) conversion method. This method can be implemented using simple analog-to-digital converters, and thus provision of a plurality of analog-to-digital converters in parallel does not leads to a significant increase in circuit complexity.

In the single-slope integration analog-to-digital conversion method, a time elapsed from the start of the conversion operation until the reference signal RAMP reaches the signal voltage subjected to the conversion is measured, and the analog signal is converted into digital data based on the elapsed time. More specifically, for example, when a reference ramp signal RAMP is supplied to a comparator (voltage comparator), counting of clock pulses is started and counting is continued until the reference ramp signal RAMP reaches the analog image signal applied to the voltage counter via the vertical signal line 19. The resultant count value is employed as digital data corresponding to the analog image signal.

In the analog-to-digital conversion process described above, a true signal level corresponding to the amount of incident light can be determined by subtracting a signal level immediately after the pixel is reset (referred to as a noise level or a reset level) from the apparent pixel signal Vsig input via the vertical signal line 19. This process is equivalent to the CDS process. Use of the difference between the apparent pixel signal and the reset level allows elimination of a noise signal component called fixed pattern noise or reset noise.

Details of Reference Signal Generator and Analog-to-Digital Converter

The reference signal generator 27 includes a DA converter (DAC (Digital Analog Converter)) 27a, whereby the reference signal generator 27 generates a stepwise sawtooth signal starting from an initial value indicated by the control data CN4 supplied from the communication/timing controller 20 in synchronization with the count clock CK0, and the generated sawtooth signal is supplied as the reference voltage (the ADC reference signal) to the column analog-to-digital converters 25 in the column processing unit 26. Although not shown in the figure, it is desirable to provide a filter for eliminating noise.

If the stepwise sawtooth signal is generated from a high-frequency clock supplied from the clock converter 23 (for example, from an up-converted signal generated by the up-converter), it is possible to obtain a higher varying rate for the stepwise sawtooth signal than is obtained when the master clock CLK0 input via the terminal 5*a* is used.

The control data CN4 supplied to the DA converter 27*a* of the reference signal generator 27 from the communication/timing controller 20 includes information for controlling the digital data to change at the same rate with time so that the ramp voltage has the same ramp (the rate of change with time) for all comparison processes. More specifically, it is desirable to change the count value by one each unit time.

Each column analog-to-digital converter 25 includes a voltage comparator 252 and a counter 254. The voltage comparator 252 is adapted to compare the analog pixel signal supplied from the pixel cell 3 via the vertical signal line 19 (H0, H1, . . . ) for each row control line 15 (V0, V1, . . . ) with the reference voltage RAMP generated by the DA converter 27*a* of the reference signal generator 27, while the counter 254 is adapted to count the time spent by the voltage comparator 252 to complete the comparison process, whereby the column analog-to-digital converter 25 functions as a n-bit analog-to-digital converter.

The communication/timing controller 20 switches a count processing mode of the counter 254, depending on whether voltage comparator 252 performs the comparison process for the signal component Vsig or the reset component ΔV of the pixel signal. For the above purpose, the communication/timing controller 20 supplies a control signal CN5 to the counter 254 of each column analog-to-digital converter 25 to control whether the counter 254 operates in a down-count mode or an up-count mode.

One input terminal RAMP of each voltage comparator 252 is connected in common to the input terminal RAMP of the other voltage comparators 252 so that the stepwise reference voltage RAMP generated by the reference signal generator 27 is applied to in common to all voltage comparators 252, while the other input terminal of each voltage comparator 252 is connected to a corresponding one of vertical signal lines 19 so that a pixel signal voltage output from the pixel array unit 10 is separately applied thereto. The signal output from the voltage comparator 252 is supplied to the counters 254.

The clock terminal CK of each counter 254 is connected in common to clock terminals CK of the other counters 254 so that the count clock CK0 output from the communication/timing controller 20 are input in common to them.

Although not shown in the figure, the counter 254 has a structure obtained by changing the interconnection configuration of the data storage unit 255 including the latch into the form of a synchronous counter so that internal counting is performed using one count clock CK0. As with the stepwise voltage signal, it is possible to generate the count clock CK0 with a higher rate than that of the master clock CLK0 input via the terminal 5*a* by generating it from the high-frequency clock (up-converted clock) supplied from the clock converter 23.

As will be described in further detail later, the counter 254 is configured in the form of a single up/down counter (U/DCNT) whose operation can be switched between a down-count mode and an up-count mode (and more specifically, switched alternately between the down-count mode and the up-count mode). In the first embodiment, the counter 254 is configured in the form of a synchronous counter which outputs a count value in synchronization with the count clock CK0.

In the synchronous counter, the operation of all flip-flops (basic elements of the counter) is limited by the count clock CK0. Therefore, when an operation at a higher frequency is required, it is desirable that the counter 254 be configured in the form of an asynchronous counter whose operating frequency is limited only by the operating frequency of a first flip-flop, which allows a high-speed operation.

A control pulse is supplied to each counter 254 from the horizontal scanning circuit 12 via a corresponding one of the control lines 12*c*. Each counter 254 has a latch to temporarily store the count result until a reset control pulse is supplied to the counter 254 via the control line 12*c*.

Each column analog-to-digital converter 25 includes, at a stage following a corresponding counter 254, a n-bit memory serving as a data storage unit 256 adapted to store the count result output from the corresponding counter 254. Each column analog-to-digital converter 25 also includes a switch 258 disposed between the corresponding counter 254 and the data storage unit 256.

A memory transfer control pulse CN8 is supplied as a control pulse from the communication/timing controller 20 to each switch 258 at a controlled timing point. Note that the memory transfer control pulse CN8 is applied in common to all switches 258 located in the same vertical column. If the switch 258 receives the memory transfer control pulse CN8, the switch 258 transfers the count value from the corresponding counter 254 to the corresponding data storage unit 256. The data storage unit 256 stores the received count value.

The mechanism of timely transfer the count value from the counter 254 to the data storage unit 256 to store the count value therein is not limited to use of the switch 258 disposed between the counter 254 and the data storage unit 256. For example, the counter 254 may be directly connected to the data storage unit 256 and the output of the counter 254 may be enabled in accordance with a memory transfer control pulse CN8, or the data capturing timing of the data storage unit 256 may be controlled by the memory transfer control pulse CN8, which functions as a latch clock in this case.

To each data storage unit 256, a control pulse output from the horizontal scanning circuit 12 is supplied via a corresponding control line 12*c*. The data storage unit 256 retains the count value captured from the counter 254 until resetting is performed by the control pulse supplied via the control line 12*c*.

The horizontal scanning circuit 12 functions as a scan-and-read unit which reads the count values stored in the respective data storage unit 256 in synchronization with the operations of the counters 254 in cooperation with the corresponding voltage comparators 252 in the column processing unit 26.

The output of each data storage unit 256 is connected to the horizontal signal bus 18. The horizontal signal bus 18 includes as many signal lines as the number, n, of bits, i.e., the bit width of data treated by the column analog-to-digital converter 25. Each signal line of the horizontal signal bus 18 is connected to the output circuit 28 via a sense circuit.

As described above, one column analog-to-digital converter 25 is disposed for each vertical signal line 19 (H0, H1, . . . ) so that the column processing unit 26 functions as a column parallel ADC.

In the configuration described above, each column analog-to-digital converter 25 performs a counting operation in a pixel signal read period corresponding to a horizontal blanking interval, and timely outputs a count result. More specifically, the voltage comparator 252 compares the voltage of the ramp signal supplied from the reference signal generator 27 with the voltage of the pixel signal supplied via the vertical signal line 19. When both voltage become equal to each other, the output of the voltage comparator 252 is inverted (from a H level to an L level, in the present embodiment).

The counter 254 starts the counting operation in a down-count mode or an up-count mode in response to the start of the ramp signal generated by the reference signal generator 27. If the counter 254 receives information indicating that the output of the comparator has been inverted, the counter 254 stops the counting operation and latches the count value at this point of time as pixel data. Thus, the analog-to-digital conversion process is completed.

Thereafter, counters 254 output stored pixel data in synchronization with horizontal selection signals CH(i) supplied from the horizontal scanning circuit 12 via the control lines 12c such that the stored pixel data are sequentially output to the outside of the column processing unit 26 and further to the outside of the chip including the pixel array unit 10 via the output terminal 5c.

Note that in addition to the parts described above, the solid-state image sensor 1 may include other parts such as signal processing circuits which are not essential to the present invention and thus which are not described herein.

Pixel Cell

Figure 2:
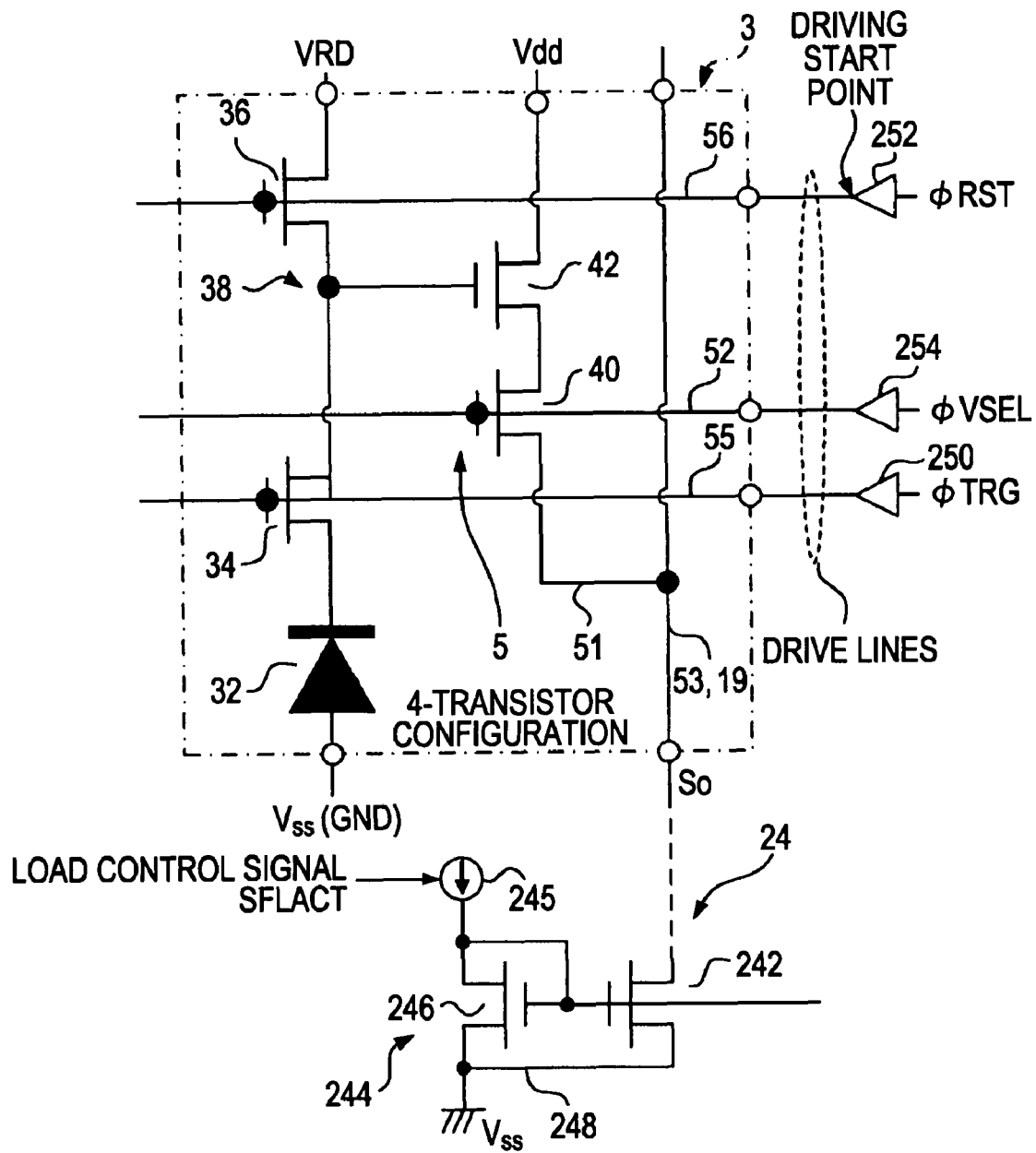
FIG. 2 is a diagram illustrating an example of a configuration of one pixel and a manner in which pixel transistors are connected to a driving unit via drive control lines.

FIG. 2 illustrates an example of a configuration of a pixel cell 3 used in the solid-state image sensor 1 shown in FIG. 1. FIG. 2 also illustrates a manner in which pixel transistors are connected to a driving unit via drive control lines. Each pixel cell 3 in the pixel array unit 10 may be configured using four transistors in a similar manner as is widely employed in CMOS image sensors. Alternatively, each pixel cell 3 may be configured using three transistors in a similar manner as disclosed in the Japanese Examined Patent Application Publication No. 2708455. Note that there is no particular limit on the configuration of the pixel cell 3, and any configuration used in a CMOS image sensor may be employed.

The in-pixel amplifier may be implemented, for example, in the form of a floating diffusion region amplifier. Each pixel cell may be implemented, for example, in a 4-transistor (4TR) configuration widely employed in a CMOS sensor. This configuration includes a read selection transistor functioning as a charge reading unit (a transfer/read gate) for reading a signal charge from a charge generator, a reset transistor functioning as a reset gate, a vertical selection transistor, and a source follower amplification transistor functioning as a detection element to detect a change in potential of the floating diffusion region.

In the example shown in FIG. 2, the pixel cell 3 is configured in the 4TR configuration including a charge generator 32 functioning to convert incident light into charges and accumulate generated charges, and four transistors connected to the charge generator 32, i.e., a read selection transistor (transfer transistor) 34 functioning as a charge reading unit (a transfer/read gate), a reset transistor 36 functioning as a reset gate, a vertical selection transistor 40, and a source follower amplification transistor 42 functioning as a detection element to detect a change in potential of the floating diffusion region 38.

In this configuration, the pixel cell 3 also includes a pixel signal generator 5 in the form of a FDA (Floating Diffusion Amplifier) including a floating diffusion region 38 functioning to inject charges and accumulate injected charges. Note that the floating diffusion region 38 is a diffusion layer having parasitic capacitance.

The read selection transistor (second transfer unit) 34 is driven by a transfer signal PTRG supplied from a transfer drive buffer 250 via a transfer line (read selection line TX) 55. The reset transistor 36 is driven by a reset signal $\phi$RST supplied from a reset drive buffer 252 via a reset line (RST) 56. The vertical selection transistor 40 is driven by a vertical selection signal $\phi$VSEL supplied from a selection drive buffer 254 via a vertical selection line (SEL) 52. The drive buffers described above are driven by the vertical drive unit 14b in the vertical scanning unit 14.

The source of the reset transistor 36 in the pixel signal generator 5 is connected to the floating diffusion region 38, the drain is connected to a power supply Vdd, and the gate (reset gate RG) is connected to the reset drive buffer 252 so that the pixel reset pulse RST is supplied from the reset drive buffer 252 to the gate of the reset transistor 36.

The vertical selection transistor 40 is connected to other parts, for example, as follows. The drain of the vertical selection transistor 40 is connected to the source of the amplifying transistor 42, the source is connected to a pixel line 51, and the gate (specifically referred to as a vertical selection gate SELV) is connected to a vertical selection line 52. Alternatively, the vertical selection transistor 40 may be connected to other parts such that the drain is connected to the power supply Vdd, the source is connected to the drain of the amplifying transistor 42, and the vertical selection gate SELV is connected to the vertical selection line 52.

A vertical selection signal SEL is applied to the vertical selection line 52. The amplifying transistor 42 is connected to other parts such that the gate is connected to the floating diffusion region 38, the drain is connected to the power supply Vdd via the vertical selection transistor 40, and the source is connected to the pixel line 51 and further to the vertical signal line 53 (19).

One end of the vertical signal line 53 extends to the column processing unit 26. In the course of this path, the vertical signal line 53 is connected to the read current source 24 such that the read current source 24 functions as a source follower capable of supplying a substantially constant current (read current) to the amplifying transistor 42.

More specifically, the read current source 24 includes a reference current source 244 including an NMOS transistor (more specifically referred to an a load MOS transistor) 242 disposed for each vertical column, a current generator 245 used in common for all vertical columns, and a NMOS transistor 246 whose gate and drain are connected together and whose source is connected to a source line 248.

The drain of each load MOS transistor 242 is connected to a vertical signal line 53 in a corresponding column, and source is connected in common to the source line 248 which is grounded. Thus, gates of all load MOS transistors 242 in the respective columns are connected together to the transistor 246 in the reference current source 244 into the form of a current mirror configuration so that each MOS transistor 242 functions as a current source for supplying a current to corresponding vertical signal line 19.

The source line 248 is grounded at ends in the horizontal direction (at leftmost and rightmost vertical columns in FIG. 1) so that an operating current (read current) for the ground terminal of each load MOS transistor 242 is supplied from both right-hand and left-hand ends of the chip.

The current generator 245 is supplied with a load control signal SFLACT from a load controller (not shown). The load control signal SFLACT controls the current generator 245 to output a predetermined current only when the current is needed. When a signal is read, the load control signal SFLACT supplied to the current generator 245 is turned into an active state so that a current with a predetermined magnitude is supplied to the respective transistors 42 from the corresponding load MOS transistors 242. That is, each load MOS transistor 242 in the form of the source follower configuration supplies the read current to the amplifying transistor 42 in the selected row thereby causing the signal to be output over the vertical signal line 53.

In the 4TR configuration described above, because the floating diffusion region 38 is connected to the gate of the amplifying transistor 42, the amplifying transistor 42 outputs a voltage as the signal corresponding to the potential of the floating diffusion region 38 (hereinafter, this potential will be referred to as a FD potential) to the vertical signal line 19 (53) via the pixel line 51.

The reset transistor 36 resets the floating diffusion region 38.

The read selection transistor (the transfer transistor) 34 transfers the signal charge generated in the charge generator 32 to the floating diffusion region 38. To select a particular pixel of a large number of pixels connected to a particular vertical signal line 19, only a vertical selection transistor 40 connected to a pixel to be selected is turned on so that the pixel to be selected is connected to the vertical signal line 19 and the signal of this pixel is output over the vertical signal line 19.

Details of Voltage Comparator

Figure 3:
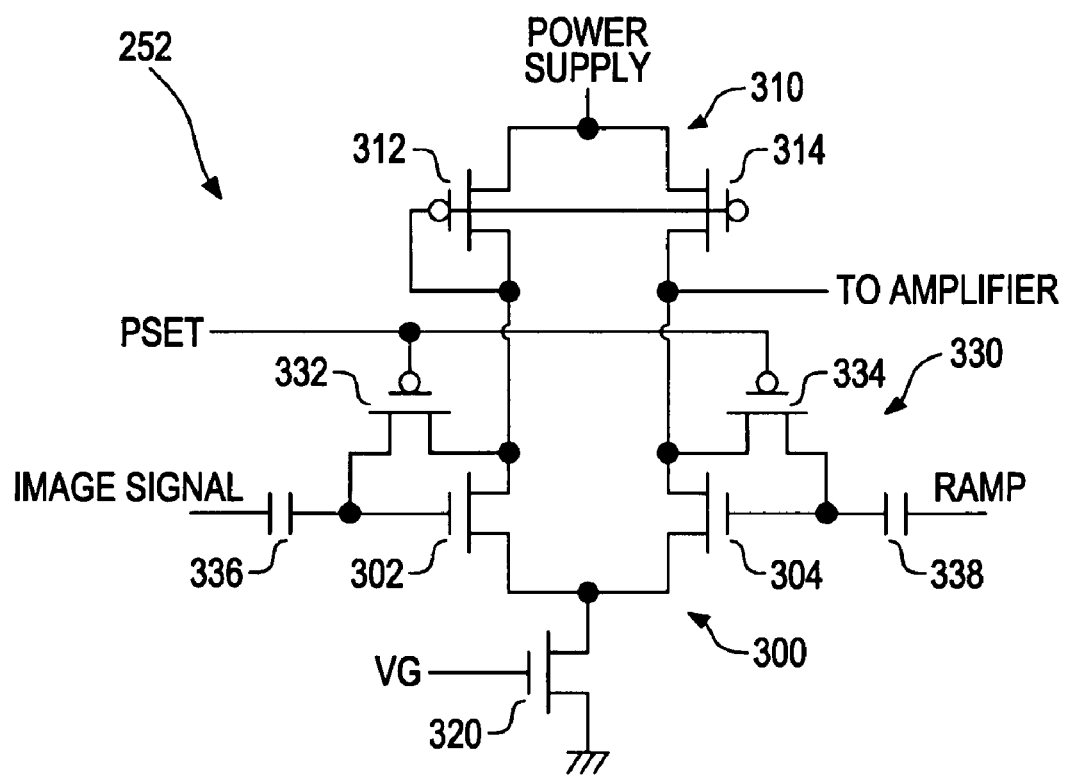
FIG. 3 is a schematic circuit diagram of a voltage comparator.

FIG. 3 is a schematic circuit diagram of the voltage comparator 252. In the present embodiment, the voltage comparator 252 is configured such that a comparison period is allowed to be set without being influenced by variation in reset component $\Delta V$.

The basic part of the voltage comparator 252 is configured in the form of a differential amplifier, which is well known in the art, using a differential transistor pair 300 including NMOS transistors 302 and 304, a load transistor pair 310 including PMOS transistors 312 and 314 connected to a power supply and serving as output loads of the differential transistor pair 300, and a constant current source 320 including a NMOS transistor 322 disposed on a ground (GND) side and serving to supply a constant current to the differential transistor pair 300 and the load transistor pair 310.

Sources of the transistors 302 and 304 are connected in common to the drain of the constant current source transistor 322. The drain (output terminal) of each of the transistors 302 and 304 is connected to the drain of corresponding one of the transistors 312 and 314 of the load transistor pair 310. A DC gate voltage VG is applied to the gate of the constant current source transistor 322.

The output of the differential transistor pair 300 (the drain of the transistor 304 in the example shown in FIG. 3) is connected to an amplifier (not shown) and further to a buffer (not shown) such that the output signal is amplified and supplied to the counter 254.

The voltage comparator 252 also includes an operating point resetting unit 330 for resetting an operating point of the voltage comparator 252. The operating point resetting unit 330 functions as an offset eliminating unit. Thus, the voltage comparator 252 is configured as a voltage comparator having a capability of eliminating an offset. The operating point resetting unit 330 includes switching transistors 332 and 334 and capacitors 336 and 338 serving as signal coupling capacitors.

The switching transistor 332 is connected between the gate (input terminal) and the drain (output terminal) of the transistor 302, and the switching transistor 334 is connected between the gate (input terminal) and the drain (output terminal) of the transistor 304. A comparator reset pulse PSET is supplied in common to the gates of the switching transistors 332 and 334.

A pixel signal Vx is supplied to the gate (input terminal) of the transistor 302 via the capacitor 336. A reference signal RAMP is supplied from a reference signal generator 27 (not shown) to the gate (input terminal) of the transistor 304.

In this configuration, the operating point resetting unit 330 samples and holds a signal input via the capacitors 336 and 338. More specifically, the comparator reset pulse PSET is turned to an active level (H level in the present embodiment) only for a short period immediately before comparison between the pixel signal Vx and the reference signal RAMP is started so that the operating point of the differential transistor pair 300 is reset to the drain voltage (read voltage (functioning as a reference value in the operation of reading the reference component or the signal component)). The pixel signal Vx is then input to the transistor 302 via the capacitor 336, and the reference signal RAMP is input to the transistor 304 via the capacitor 338, and comparison is performed until the pixel signal Vx and the reference signal RAMP become equal to each other. When the pixel signal Vx and the reference signal RAMP become equal to each other, the output of the voltage comparator 252 is inverted.

In the operation described above, when the comparator reset pulse PSET is supplied, the gate and the drain of each of the transistors 302 and 304 of the differential transistor pair 300 are connected together so that the transistors 302 and 304 function equivalently as diodes, and the sum of the input to the amplifying transistor 42 of the pixel cell 3 and the offset component of the transistor 304 is held at the input terminal (gate) of the transistor 304. In this state, the reference signal RAMP is input, and the comparison between the pixel signal Vx and the reference signal RAMP is started. In the operation described above, the operating point of the voltage comparator 252 is determined by the read voltage of the pixel signal. This minimizes the influence of the variation in the reset component $\Delta V$ on the operation.

Operation of Solid-State Image Sensor

FIG. 4 is a timing chart associated with a signal acquisition process and a difference extraction process performed by a column analog-to-digital converter 25 in the solid-state image sensor 1 shown in FIG. 1.

The conversion of the analog pixel signal detected by each pixel cell 3 of the pixel array unit 10 into a digital signal can be performed, for example, as follows. The reference component or the signal component of the pixel signal output from the pixel cell 3 is compared with the ramp-shaped reference signal RAMP falling down at a predetermined rate until equality between voltages under comparison is detected. The elapsed from the start of the reference signal RAMP till the detection of equality between the reference component or the signal component of the pixel signal and the reference signal is measured by counting the number of count clocks, thereby acquiring the count value corresponding to the reference component or the signal component of the pixel signal.

As the pixel signal So output via the vertical signal line 19, the reset level Srst of the pixel signal as the reference level including noise appears first in time sequence, and then the signal level Ssig appears. Thus, in a first comparison operation, the comparison is performed first for the reference level (the reset level Srst which is substantially equivalent to the reset component $\Delta V$), and then in a second comparison operation, the comparison is performed for the signal level Ssig which is the sum of the reset level Srst and the signal component Vsig, as described in further detail below.

In the first comparison operation, the communication/timing controller 20 resets the count value of the counter 254 to the initial value "0" and sets the counter 254 in the down-count mode. When the signal read from a pixel cell 3 in a particular row Hx via a corresponding vertical signal line 19 (H0, H1, . . . ) has become stable, the communication/timing controller 20 turns the comparator reset pulse PSET into the active level (L level) thereby resetting the voltage comparator 252 (t8 to t9). As a result, the variation in the reset level of the pixel cell 3 of interest and the offset voltage of the voltage comparator 252 are stored and absorbed respectively in the capacitors 336 and 338.

Note that the variation in the reset level originates from reset noise of the pixel signal and the variation in the threshold. The reset noise of the pixel signal includes kTC noise at a point of time at which the voltage comparator 252 is reset, the variation in coupling of the comparator reset pulse PSET, and the variation in the feed-through noise.

The control data CN4 is then supplied to the reference signal generator 27 to generate the reference signal RAMP (t10). In response to receiving the control data CN4, the reference signal generator 27 generates the time-varying stepwise sawtooth signal and supplies it as the reference voltage to the input terminal RAMP of the voltage comparator 252. The voltage comparator 252 compares this ramp-shaped reference voltage with the voltage of the pixel signal supplied from the pixel array unit 10 via a particular vertical signal line 19 (Vx).

In order for the counter 254 disposed for each column to start counting the comparison time spent by the voltage comparator 252 at the time at which the reference voltage RAMP is input to the input terminal RAMP of the voltage comparator 252, the count clock CK0 output from the communication/timing controller 20 is input to the clock terminal of the counter 254 in synchronization with the start of the ramp voltage supplied from the reference signal generator 27. Thus, the first-time counting is started from the initial value "0" in the negative direction.

The voltage comparator 252 compares the ramp-shaped reference voltage RAMP supplied from the reference signal generator 27 with the pixel signal voltage Vx supplied via the vertical signal line 19. If these two voltages become equal, the voltage comparator 252 inverts the comparator output from the H level to the L level. That is, as a result of the comparison between the voltage signal (reset level Srst) corresponding to the reset component Vrst with the reference voltage RAMP, the voltage comparator 252 generates an active-low pulse signal whose width corresponds to the magnitude of the reset component Vrst, and the voltage comparator 252 supplies the pulse signal to the counter 254.

In response to receiving the pulse signal from the voltage comparator 252, the counter 254 stops the counting operation at substantially the same time as the inversion of the comparator output, and the counter 254 latches the count value at this point of time as pixel data. Thus, the analog-to-digital conversion is complete. That is, the voltage comparator 252 generates an active-low pulse signal whose width corresponds to the magnitude of the reset component Vrst, and the counter 254 counts the number of count clocks CK0 generated during a period of time corresponding to the width of the signal pulse generated by the voltage comparator 252 thereby obtaining the count value corresponding to the magnitude of the reset component Vrst.

At the end of the down-count period, the communication/timing controller 20 stops supplying the control data to the voltage comparator 252 and the count clock CK0 to the counter 254. In response, the voltage comparator 252 stops generating the ramp-shaped reference voltage RAMP (t14).

In the first-time reading operation described above, the reset level Vrst of the pixel signal voltage Vx is detected by the voltage comparator 252 and is counted by the counter 254. Thus, the reset component ΔV of the pixel cell 3 is detected.

The reset component ΔV includes noise that creates an offset varying from one pixel cell 3 to another. However, the variation in the reset component ΔV is generally small. Besides, the reset level Srst is similar for all pixels. Thus, the output value for the reset component ΔV of the pixel signal voltage Vx supplied via any vertical signal line 19 falls within a predictable narrow range.

When the voltage comparator 252 is reset by the comparator reset pulse PSET, the operating point is set to the read voltage obtained in the first-time operation. Thus, regardless of the variation in the reset component ΔV, the gain can be increased without causing the reset level Srst to fall outside the allowable comparison range. Therefore, in the first-time reading operation of the reset component ΔV it is allowed to reduce the down-count period (the comparison period) by adjusting the reference signal RAMP. For example, the maximum period for comparison of the reset component ΔV may be set to a period corresponding to 7 bits (128 clocks), and the comparison of the reset level Srst (reset component ΔV) may be performed within this period.

In the following second-time reading operation, a signal including the reset component ΔV and the signal component Vsig corresponding to the amount of light incident on the pixel cell 3 is read, and the reading operation is performed in a similar manner to the first-time operation except that the comparator reset pulse PSET is maintained in the off-level (H level) so that the voltage comparator 252 is not reset by the comparator reset pulse PSET.

That is, first, the communication/timing controller 20 sets the counter 254 in the up-count mode. When the signal read from the pixel cell 3 in the row Hx via the corresponding vertical signal line 19 (H0, H1, . . . ) has become stable, the communication/timing controller 20 supplies the control data CN4 to the reference signal generator 27 to generate the reference voltage RAMP.

In response to receiving the control data CN4, the reference signal generator 27 generates the time-varying stepwise sawtooth signal and supplies it as the reference voltage to the input terminal RAMP of the voltage comparator 252. The voltage comparator 252 compares this ramp-shaped reference voltage with the voltage of the pixel signal supplied from the pixel array unit 10 via a particular vertical signal line 19 (Vx).

In order for the counter 254 disposed for each column to start counting the comparison time spent by the voltage comparator 252 at the time at which the reference voltage RAMP is input to the input terminal RAMP of the voltage comparator 252, the count clock CK0 output from the communication/timing controller 20 is input to the clock terminal of the counter 254 in synchronization with the start (t20) of the ramp voltage supplied from the reference signal generator 27. Thus, the second-time counting operation starts. In this second-time counting operation, as opposed to the first-time operation, up-counting is performed starting from the count value corresponding to the reset component ΔV of the pixel cell 3 acquired in the first-time reading operation. That is, the counting is performed in the opposite direction.

The voltage comparator 252 compares the ramp-shaped reference voltage RAMP supplied from the reference signal generator 27 with the pixel signal voltage Vx supplied via the vertical signal line 19. If these two voltages become equal, the voltage comparator 252 inverts the comparator output from the H level to the L level (t22). That is, as a result of the comparison between the voltage signal corresponding to the signal component Vsig with the reference voltage RAMP, the voltage comparator 252 generates an active-low pulse signal whose width corresponds to the magnitude of the signal component Vsig, and supplies the resultant pulse signal to the counter 254.

In response to receiving the pulse signal from the voltage comparator 252, the counter 254 stops the counting operation at substantially the same time as the inversion of the comparator output, and the counter 254 latches the count value at this point of time as pixel data. Thus, the analog-to-digital conversion is complete (t22). That is, the voltage comparator 252 generates an active-low pulse signal whose width corresponds to the magnitude of the reset component Vrst, and the counter 254 counts the number of count clocks CK0 generated during a period of time corresponding to the width of the signal pulse generated by the voltage comparator 252 thereby obtaining the count value corresponding to the magnitude of the signal component Vsig.

At the end (t24) of the down-count period, the communication/timing controller 20 stops supplying the control data to the voltage comparator 252 and the count clock CK0 to the counter 254. In response, the voltage comparator 252 stops generating the ramp-shaped reference voltage RAMP.

In the second-time reading operation described above, the signal component Vsig of the pixel signal voltage Vx is detected by the voltage comparator 252 and is counted by the counter 254. Thus, the signal component Vsig of the pixel cell 3 is detected.

In the present embodiment, as described above, the counting operation of the counter 254 is performed in the down-count mode in the first-time reading, and in the up-count mode in the second-time reading. As a result, the difference between count value of the reset level Srst and the count value of the signal level Ssig is automatically determined by the counter 254, and the resultant count value is held in the counter 254. Note that the count value held in the counter 254 corresponds to the signal component Vsig.

As described above, by performing the counting in the down-count mode in the first-time reading operation and in the up-count mode in the second-time reading operation, the reset component ΔV varying from one pixel cell 3 to another and the offset component of each column analog-to-digital converter 25 are eliminated, and the pure signal component Vsig corresponding to the amount of light incident on the pixel cell 3 is easily detected by the simple configuration described above. Note that reset noise is also eliminated.

Thus, the column analog-to-digital converter 25 according to the present embodiment has a CDS (Correlated Double Sampling) function in addition to a function of an analog-to-digital converter for simply converting analog pixel signal to digital pixel data.

The pixel data indicated by the count value held in the counter 254 indicates a positive signal voltage, and thus a complementary operation is not needed. This provides high compatibility with existing systems.

In the second-time reading operation, the signal component Vsig corresponding to the amount of incident light is read. In order to detect the amount of incident light varying over a wide range, it is desirable to set the up-count period, i.e., the comparison period (t20 to t24) to be large enough, and set the ramp voltage supplied to the voltage comparator 252 to change over a large range.

In the present embodiment, in view of the above, the maximum comparison period for the signal component Vsig is set to be equal to a count period of 10 bits (1024 clocks), and the comparison of the signal component Vsig is performed in this comparison period. That is, the maximum comparison period for the reset component ΔV (reference component) is set to be smaller than the maximum comparison period for the signal component Vsig. That is, the maximum comparison period (the maximum analog-to-digital conversion period) is set not to be equal for the reset component ΔV (reference component) and the signal component Vsig, but the maximum comparison period is set to be smaller for the reset component ΔV (reference component) than for the signal component Vsig, thereby minimizing the total comparison period.

In this case, the number of comparison bits is different between the first-time operation and the second-time operation. The communication/timing controller 20 supplies control data to the reference signal generator 27 to generate the ramp reference voltage RAMP changing at the same rate for the first-time operation and the second-time operation. Because the generation of the ramp reference voltage RAMP is digitally controlled in the manner as described above, it is easy to set the slope of the ramp voltage to be equal for the first-time operation and the second-time operation. This ensures that the equal analog-to-digital conversion accuracy is obtained for the first-time operation and the second-time operation, and thus high accuracy is ensured for the difference extraction process performed by the up/down counter.

In the present embodiment, the column analog-to-digital converter 25 includes a data storage unit 256 disposed separately for each counter 254. At a time (t30) before the operation of the counter 254 starts, a count value for a previous row Hx−1 is transferred to the data storage unit 256 in accordance with a memory transfer control pulse CN8 output from the communication/timing controller 20.

More specifically, the data in the counter 254 is saved into the data storage unit 256 after the end of each analog-to-digital conversion period, and the column analog-to-digital converter 25 starts the analog-to-digital conversion operation for a next row Vx+1. During a period in which the analog-to-digital conversion operation is being performed for the next row Vx+1, data is sequentially selected from the data storage units 256 in the respective columns by the horizontal scanning circuit 12 and output via the output circuit 28.

In a configuration including no data storage unit 256, pixel data is output from the column processing unit 26 after the second-time reading operation is completed, that is, after the full analog-to-digital conversion process is completed, and thus this limits the reading operation. In contrast, in the configuration including data storage unit 256 as with the configuration according to the present embodiment, there is no restriction on the reading operation because the count value indicating the previous difference extraction result is transferred to the data storage unit 256 before the first-time reading operation is started.

The capability of transferring the count value from the counter 254 to the data storage unit 256 makes it possible to independently control the counting operation of the counter 254, that is, the analog-to-digital conversion operation and the operation of reading the count value to the horizontal signal bus 18. This makes it possible to perform the analog-to-digital conversion operation and the operation of reading data to the outside in parallel in a pipeline operation manner.

In the solid-state image sensor 1 according to the present embodiment, as described above, the counting operation is performed twice using the up/down counter while switching the counting mode. In the solid-state image sensor 1 with pixel cell 3 arranged in the form of an array, the column analog-to-digital converters 25 are disposed in the column-parallel fashion such that one column analog-to-digital converter 25 is disposed for each vertical column.

This configuration allows the difference between the signal level Ssig and the reference level (reset level Srst) to be directly acquired as the count value of the second-time operation for each vertical column. The memory for storing the count result for the reset level Srst and the signal level Ssig is realized by the latch disposed in the counter, and it is not necessary to dispose an additional separate memory for storing the count value.

Besides, it is not necessary to dispose an additional subtractor dedicated to calculation of the difference between the digital data corresponding to the signal level of the reference component (reset level Srst) and the signal level Ssig corresponding to the signal component. This allows a reduction in the total circuit complexity and a reduction in a physical circuit size.

Furthermore, reductions in noise, current, and power consumption are achieved.

Furthermore, because each column analog-to-digital converter (analog-to-digital converter) is configured to include a comparator and a counter, counting operation can be controlled by using only one count clock line and one control line for switching the count mode, regardless of the number of bits. Thus, unlike the conventional configuration, signal lines for transmitting the count value from the counter to the memory are not necessary. This allows reductions in noise and power consumption.

That is, in the solid-state image sensor 1 including the analog-to-digital converter disposed on the single chip, each column analog-to-digital converter 25 is configured using one voltage comparator 252 and one counter 254 such that the counter 254 operates alternately in the down-count mode and the up-count mode thereby allowing the difference between the signal component and the reference component (reset component) to be automatically determined in the form of digital data. This allows reductions in the circuit complexity, the physical circuit size, the power consumption, the number of lines for interfacing with other devices, and noise or consumption current due to such interface lines.

The provision of the data storage unit 256 disposed at the stage following the counter 254 makes it possible to perform in parallel the operation of the counter 254 to read data for a current row Hx and the operation of outputting the signal from the data storage unit 256 via the horizontal signal bus 18 and further via the output circuit >28. This allows the signal to be output in a very efficient manner.

The provision of the operating point resetting unit 330 having the sample-and-hold capability in the voltage comparator 252 can generate kTC noise. However, kTC noise is eliminated via the process in which the second-time reading operation is performed while maintaining the comparator reset pulse PSET in the off-state so that the kTC noise generated in the sample-and-hold of the comparator reset pulse PSET in the first-time reading operation is cancelled out between the first-time operation and the second-time operation via the subtraction process performed by the counter 254. Thus, it is possible to acquire digital value for the pure signal component Vsig corresponding to the amount of light incident on the respective pixel cells 3, without being influenced by kTC noise.

That is, in the counter 254, the count value obtained in the first-time operation is directly subtracted from the count value obtained in the second-time operation in which the reading is performed while maintaining the value obtained in the first-time operation, and thus not only offset noise or other fixed noise but also kTC noise caused by the sample-and-hold process is cancelled out.

The problem of an increase in reset level Srst caused by a variation in reset component beyond an allowable range in the comparison process can be avoided by turning on the comparator reset pulse PSET in the operating point resetting unit 330 having the sample-and-hold function before the comparison process is started, for both first-time operation and second-time operation. In this regard, it is necessarily needed to perform the second-time reading operation while maintaining the comparator reset pulse PSET in the off-state. However, in this case, elimination of kTC noise by the sample-and-hold function cannot be achieved.

Details of Problems with Column Analog-to-Digital Conversion

Figure 5A:
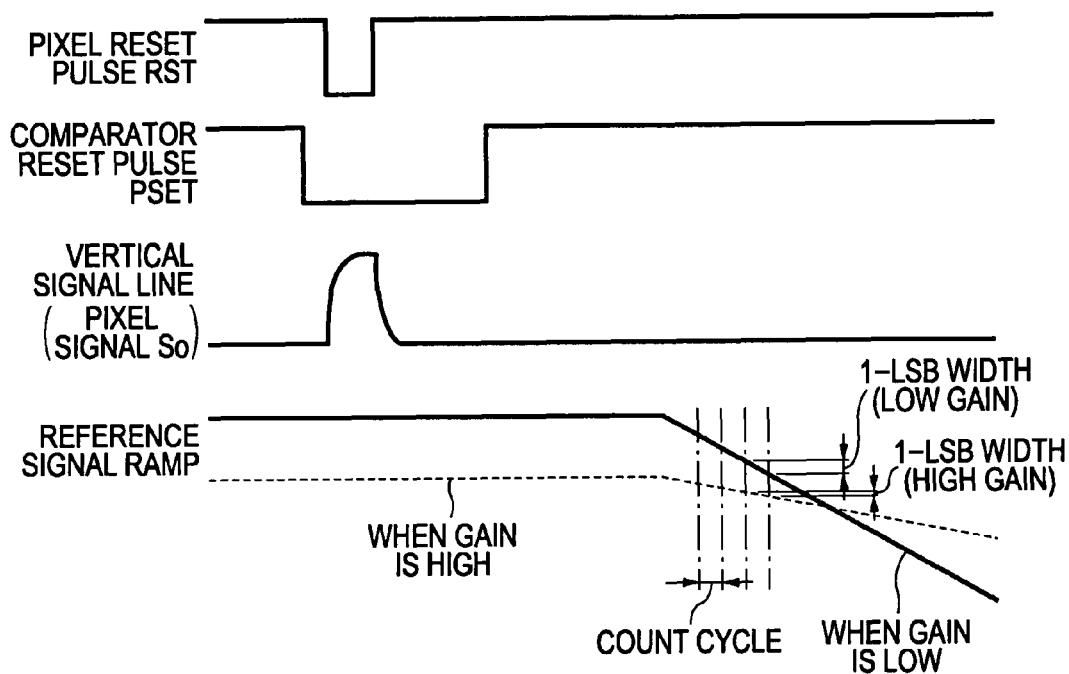
FIGS. 5A to 5C illustrate a relationship among a slope of a reference signal, an analog-to-digital conversion gain, and an analog-to-digital conversion resolution.
Figure 5B:
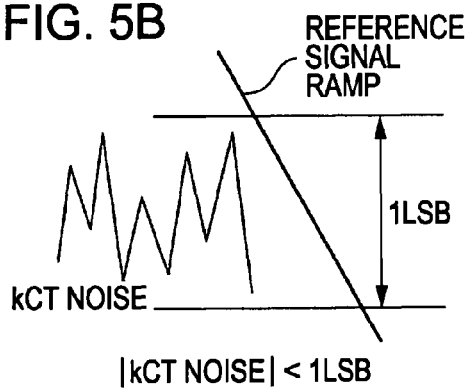
Figure 5C:
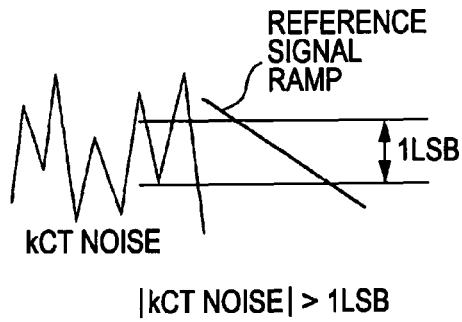
Figure 6:
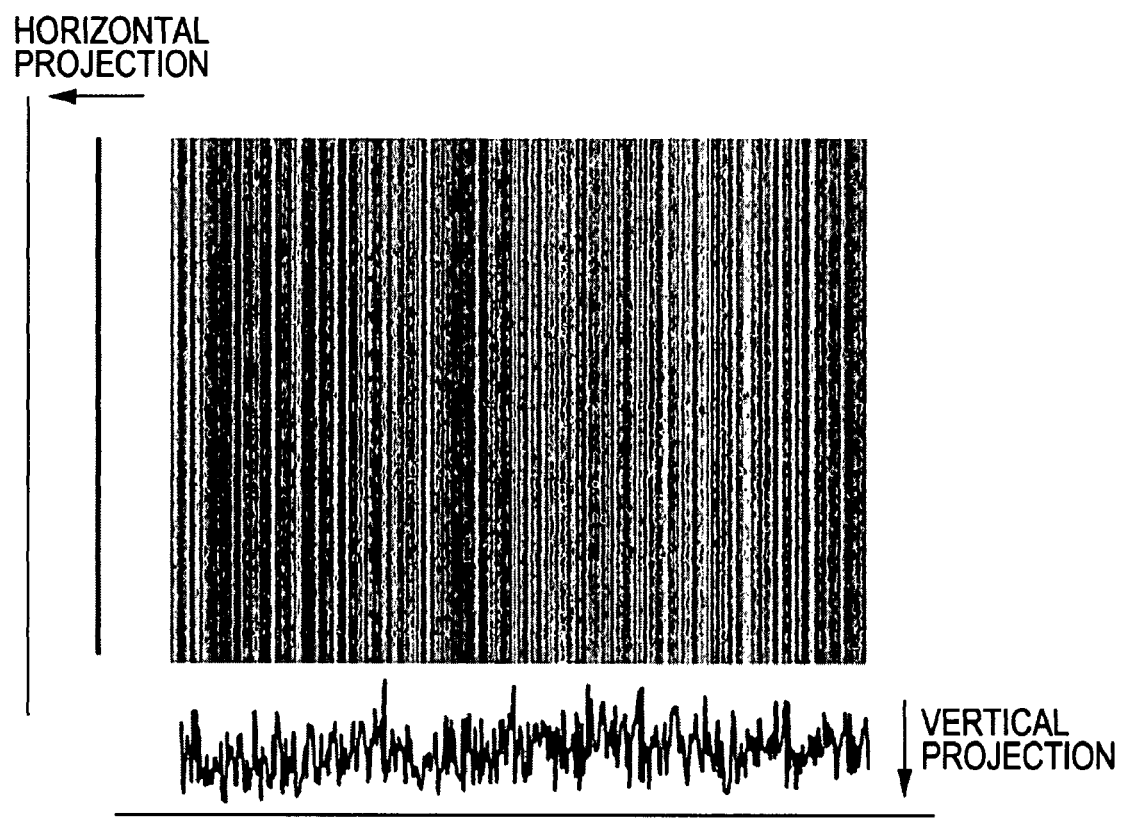
FIG. 6 illustrates, in the form of an image, a result of analog-to-digital conversion of a reset level which is typically obtained when a noise reduction process according to an embodiment of the invention is not performed.
Figure 7:
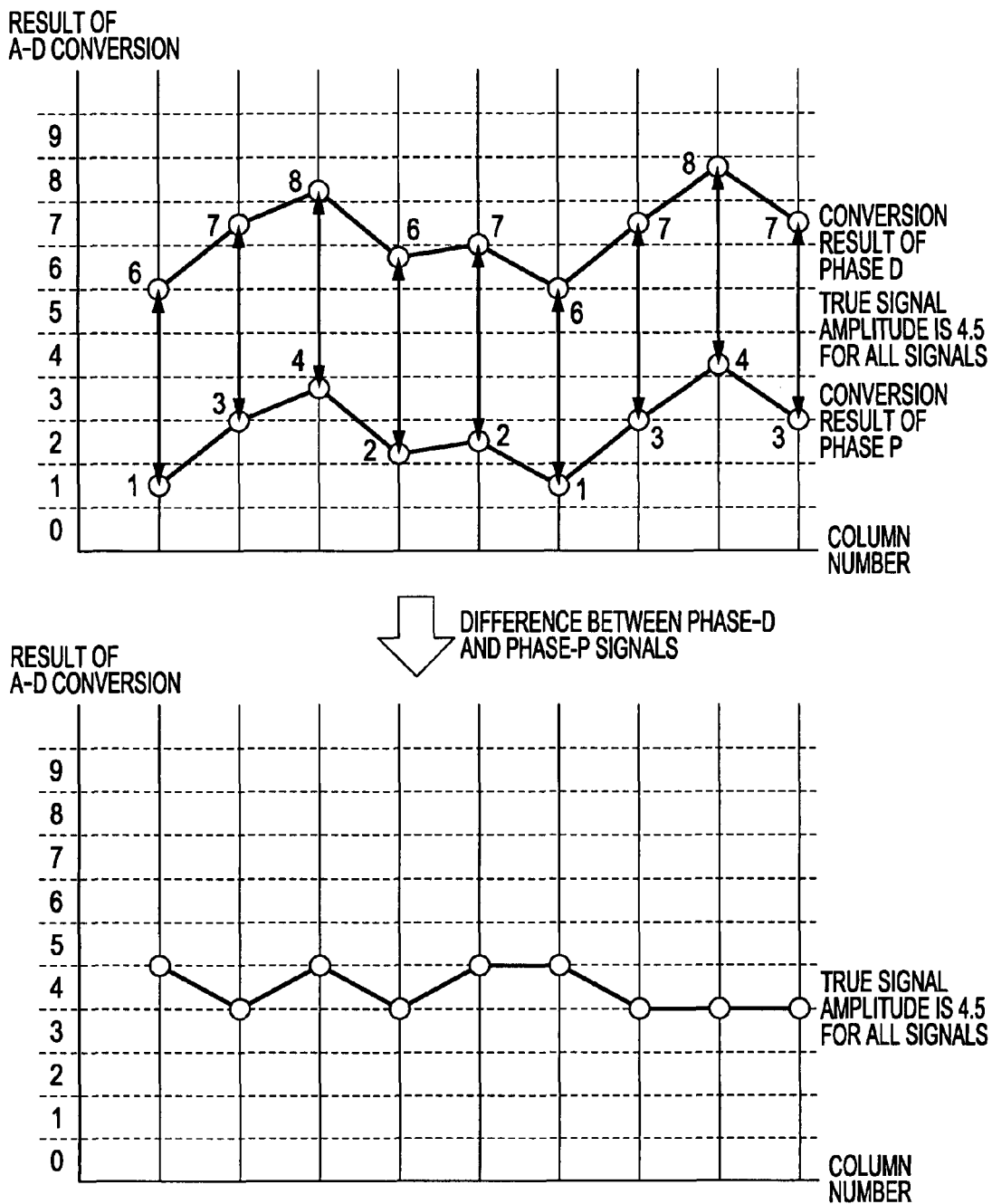
FIG. 7 is a diagram for explanation of a quantization error.
Figure 8:
FIG. 8 illustrates an example of an image having a quantization error included in data output via a differential signal extraction process.

Referring to FIGS. 5A to 5C and FIGS. 6 to 8, the problems that can occur in the column analog-to-digital conversion are described in further detail below. FIGS. 5A to 5C illustrate relationships among the slope of the reference signal RAMP, the analog-to-digital conversion gain, and the analog-to-digital conversion resolution, in the analog-to-digital conversion, by way of example, of the reset level Srst of the pixel signal So. FIG. 6 illustrates an example of a result of analog-to-digital conversion of a reset level Srst for a case in which the vertical streak noise reduction process according to the present embodiment is performed. In this figure, the result obtained in the form of digital data is represented in the form of an image. FIG. 7 illustrates a problem associated with a quantization error. FIG. 8 illustrates an example of an image including quantization errors remaining in data after the difference extraction process.

In the present embodiment, the column processing unit 26 (more particularly, the column analog-to-digital converter 25 therein) performs the analog-to-digital conversion using the single-slope integration scheme for the reset level (reset voltage) in the first-time operation and for the signal level (signal voltage) in the second-time operation. In the first-time operation of the analog-to-digital conversion, the reset voltage is processed in one of the two modes, i.e., the up-count mode and the down-count mode. In the second-time operation, the signal voltage is processed in the other mode different from the mode used in the first-time operation. Thus, at the end of the second-time operation, digital data indicating the difference between the result of the second-time operation and the result of the first-time operation is automatically obtained.

In the analog-to-digital conversion using the single-slope integration such as that used in the present embodiment, the resolution of the analog-to-digital conversion, i.e., the size of one LSB is determined by the counting rate of the counter 254 in a period in which the reference signal RAMP with a ramp waveform is applied, and the slope of the ramp-shaped reference signal RAMP.

More specifically, if the time needed for the counter 254 to perform one count clock is denoted as a count cycle, then the resolution of the analog-to-digital conversion (the size of the one LSB) is defined by the change in the reference signal RAMP that occurs during the one cycle. The smaller the size of one LSB, the higher the resolution of the analog-to-digital conversion. Conversely, the greater the size of one LSB, the smaller the resolution of the analog-to-digital conversion.

Thus, from the point of view of the counting rate, the greater the counting rate, the shorter the count cycle. When the slope of the reference signal RAMP is maintained unchanged, the shorter the count cycle, the smaller the change in reference signal RAMP during the count cycle, and thus the smaller the size of one LSB, and the higher the resolution of the analog-to-digital conversion. When the slope of the reference signal RAMP is maintained unchanged, the greater the counting rate, the greater number of counts are counted until the reference signal RAMP and the signal voltage on the vertical signal line 19 become equal, and thus the greater value the resultant digital data has, and the greater analog-to-digital conversion gain is obtained.

On the other hand, from the point of view of the slope of the reference signal RAMP, when the counting rate is maintained unchanged, the smaller the slope of the reference signal RAMP, the smaller the change in the reference signal RAMP during the count cycle, and thus the smaller the size of one LSB, and the higher the resolution of the analog-to-digital conversion. When the counting rate is maintained unchanged, the smaller the slope of the reference signal RAMP, the longer time is necessary for the reference signal RAMP and the signal voltage on the vertical signal line 19 become equal, and thus the greater value the resultant digital data has, and the greater analog-to-digital conversion gain is obtained.

For example, when the counting rate is maintained unchanged, the size of one LSB is great for a reference signal RAMP represented by a solid line in FIG. 5A, but the size of one LSB is small for a reference signal RAMP represented by a broken line in FIG. 5A.

When the counting rate is maintained unchanged, if the size of one LSB is changed by changing the slope of the reference signal RAMP, the length of time necessary for the reference signal RAMP and the signal voltage on the vertical signal line 919 to become equal changes, and thus the count value, i.e., the digital data of the signal voltage changes even when the signal voltage on the vertical signal line 919 remains unchanged. This means that changing the slope of the reference signal RAMP is equivalent in effect to changing analog-to-digital conversion gain, and also equivalent to changing the read gain.

In the analog-to-digital conversion using the single slope integration scheme, in order to eliminate noise caused by the variation in the reset level of the pixel signal So output from the pixel cells 3 or caused the offset voltage of the voltage comparator 252, the voltage comparator 252 is reset by the comparator reset pulse PSET before the analog-to-digital conversion is started. However, in practical operation of the voltage comparator 252, all noise is not eliminated, and there is some residual noise.

Noise remaining after the voltage comparator 252 is reset by the comparator reset pulse PSET is discussed below. Examples of such noise remaining after the voltage comparator 252 is reset include kTC noise which occurs when the comparator reset pulse PSET is turned to the off level (H level, in the present embodiment), and a column-to-column variation in the inverting speed of the voltage comparator 252 (hereinafter, refereed to simply as an inverting speed variation). Of these two types of noise, the inverting speed variations of the voltage comparators 252 can create a significant problem in an image.

Ideally, kTC noise occurring in a sample-and-hold operation can be eliminated when the count value obtained in the first-time read operation is subtracted from the count value obtained in the second-time read operation in the difference extraction process performed by the counter 254. However, in the actual configuration, voltage comparators 252 are disposed for respective vertical columns, and all these voltage comparators 252 share and the power supply voltage (Vdd), the ground voltage (Vss), the reference signal line 251 via which the reference signal RAMP is transmitted, and the reset control line 331 (also referred to as a PSET control line 331) via which the comparator reset pulse PSET is transmitted.

Thus, if noise occurs in a voltage comparator 252 in a certain column, this noise can influence the operation of a voltage comparator 252 in another column via one or more of the common signal/power lines described above, and thus can influence the result of the analog-to-digital conversion.

In particular, a significant problem can be brought about by switching transistors 332 and 334 which are for setting operating points in the comparison process and which are disposed in the path of the analog signal to be processed or in the path of the reference signal RAMP. When these switching transistors 332 and 334 are switched by the common comparator reset pulse PSET, noise can propagate via the comparator reset pulse PSET, which can give a voltage variation to the reference signal RAMP.

More specifically, examples of noise are feed-through noise and charge injection noise of the PSET switching transistors 332 and 334 which occur when the comparator reset pulse PSET is turned into the inactive level (H level, in the present embodiment). Another example is kTC noise which can cause a variation in the operating point.

The noise propagating through the PSET control line 331 causes the voltage of the reference signal RAMP to deviate from ideal value Vref to Vref+ΔVref(t) where ΔVref(t) is time-varying noise component.

The comparator reset pulse PSET has a delay varying depending on locations and performance of switches, and thus the turning-off timing of PSET switching transistors 332 and 334 varies from one vertical column to another. Thus, noise component ΔVref(t) generated in a certain voltage comparator 252 when the comparator reset pulse PSET is turned off can reach, via the reference signal line 251, a reference signal input node (gate of a transistor 303) of a voltage comparator 252 to which the comparator reset pulse PSET is not yet turned off, and can change the reset voltage Vref of this transistor 303. This results in an occurrence of a column-to-column variation ΔVref in the voltage of the differential input gate. Note that kTC noise generated when the comparator reset pulse PSET is turned off is two-dimensionally random.

As shown in FIG. 5B, when kTC noise is smaller than the size of one LSB of the analog-to-digital conversion, that is, when the analog-to-digital conversion gain is set to be small enough that kTC noise does not influence the result of the analog-to-digital conversion and thus no kTC noise appears in the result of the analog-to-digital conversion, noise appearing in the first-time analog-to-digital conversion operation for processing the reset level is only noise which originates from the column-to-column variation in the inverting speed and which remains without being perfectly eliminated by the resetting of the voltage comparator 252 by the comparator reset pulse PSET.

The result of the analog-to-digital conversion obtained at this processing stage can include noise in the form of vertical streaks as shown in FIG. 6. As can be seen from FIG. 6, regarding the result output from the voltage comparators 252, there is a rather great variation in the digital value obtained as the result of the analog-to-digital conversion from one column to another, although no significant variation is observed among values along the same column.

This is because the inverting speed of the voltage comparators 252 disposed for respective columns varies from one column to another, but the inverting speed is equal for the same column, and thus digital data obtained as a result of the analog-to-digital conversion of the reset level, which is the reference level in the difference extraction process, has substantially the same value along each column.

As shown in FIG. 5C, when kTC noise is greater than the size of one LSB of the analog-to-digital conversion, that is, when the analog-to-digital conversion gain is set to be great enough (or the slope of the reference signal RAMP is small enough) that residual kTC noise appears in the result of the analog-to-digital conversion, two-dimensionally random kTC noise appears in the result of the first-time operation of analog-to-digital conversion, and vertical streak noise due to the column-to-column variation in inverting speed is hidden behind the kTC noise. That is, when kTC noise is sufficiently greater than the size of one LSB, two-dimensional spatially random noise intrudes into the reset level of the pixel signal So, and vertical streak noise due to the column-to-column variation in inverting speed is hidden behind the kTC noise.

After the analog-to-digital conversion of the reset level is completed, the analog-to-digital conversion of the signal level is performed. In this analog-to-digital conversion operation, the signal level of the pixel signal So output from the pixel cell 3 is subjected to the analog-to-digital conversion using the single slope integration scheme in the up-count mode or the down-count mode different from the mode used in the analog-to-digital conversion operation for the reset level, starting from the digital value obtained for the reset level as the initial value, whereby the digital value obtained as a result of the analog-to-digital conversion for the reset level is automatically subtracted from the digital value for the signal level. Thus, the digital data subjected to the difference extraction process indicates the pure signal value.

The apparent signal level includes the reset level superimposed on the signal level. Therefore, the variation component of the inverting speed of the voltage comparator 252 included in the reset level is also included in the signal level. Theoretically, the variation component of the inverting speed can be eliminated by subtracting the digital value obtained as a result of the analog-to-digital conversion of the reset level from the digital value obtained as a result of the analog-to-digital conversion of the apparent signal level. However, in practice, a quantization error occurs when the subtraction described above is performed digitally in the counter 254.

Referring to FIGS. 7A and 7B, quantization errors are discussed below. In FIG. 7A, a horizontal axis represents a column number, and a vertical axis represents a signal level of an arbitrary row. When the original input given in the form of an analog quantity is converted into digital quantity, the value is rounded in units of LSBs. For example, if a signal with a magnitude corresponding to 4.5 LSBs is equally input as the reset level for all columns, when the signal is converted into digital data, the value is rounded in units of LSBs.

FIG. 7B illustrates a plot of a result of subtracting digital data obtained as a result of analog-to-digital conversion of the reset level from digital data obtained as a result of analog-to-digital conversion of the signal level. Although the true signal level has a value corresponding to 4.5 LSBs for all columns, the result of the difference extraction process performed in the digital domain includes a quantization error, and thus resultant digital takes a value of 4 or 5 LSBs, that is, quantization errors cause the result to be scattered in the range of ±0.5 LSBs around the true value 4.5 LSBs.

If the subtraction is performed in the analog domain, the result will be equal to a value corresponding to 4.5 LSBs for all columns. However, if the subtraction is performed in the digital domain, a quantization error inevitably occurs.

Thus, when reset levels are substantially equal along each column but vary from one column to another as shown in FIG. 6, if the difference is extracted between the result of analog-to-digital conversion of signal levels on which the reset levels are imposed and the result of the analog-to-digital conversion of the reset levels, the result of the difference extraction operation will be as follows.

If signal levels output from pixels in the same column are equal, when they are processed via the voltage comparator 252, quantization errors superimposed on the result are also equal for the same column. However, even in this case, quantization errors vary from one column to another.

Thus, the result of the subtraction of the digital data obtained as the result of the analog-to-digital conversion of the reset level from the digital data obtained as the result of the analog-to-digital conversion of the signal level has a quantization error of ±0.5 LSBs which is equal for the same column but which varies from one column to another. Therefore, an image of the resultant digital data includes vertical streak noise caused by the quantization errors as shown in FIG. 8.

As described above, noise caused by quantization errors which occur in the difference extraction process appears in a similar manner in the analog-to-digital conversion process as with noise caused by variations in inverting speed of the voltage comparators 252, and vertical streak noise appears in a final image.

As discussed above, vertical streak noise caused by quantization errors is essential to the column analog-to-digital converter 25 according to the present embodiment as long as the difference extraction process is performed in the digital domain. In particular, when the analog-to-digital conversion gain is low, the size of one LSB in the analog-to-digital conversion process is large, i.e., the analog-to-digital conversion resolution is low, and thus conspicuous vertical streak noise appears in a final image.

As described above, in the column analog-to-digital converter 25 employed in the present embodiment, two main factors which cause vertical streak noise are as follows. First, quantization errors occur when the difference extraction process is performed in the digital domain. Second, the reference level in the difference extraction process performed in the digital domain is given by the digital value obtained as the result of the analog-to-digital conversion of the reset level and this reference level is equal for the same column as shown in FIG. 6. Therefore, when the difference extraction process is performed between the digital value obtained as the result of the analog-to-digital conversion of the signal level and the digital value of the reference level, quantization errors occurring in the difference extraction process are equal for the same column but vary from one column to another as shown in FIG. 8.

Of the two factors described above, the quantization error inevitably occurs when the subtraction is performed in the digital domain, and cannot be avoided as long as the subtraction is performed in the digital domain. On the other hand, it is possible to avoid the column-to-column variation in quantization error which appears in the result of subtraction of the digital data of AD-converted signal level from the digital data of AD-converted reset level, by preventing variations from being accumulated in each column. Specific examples of methods of preventing the column-to-column variation in quantization error are described below.

Basic Method of Reducing Vertical Streak Noise

Figure 9A:
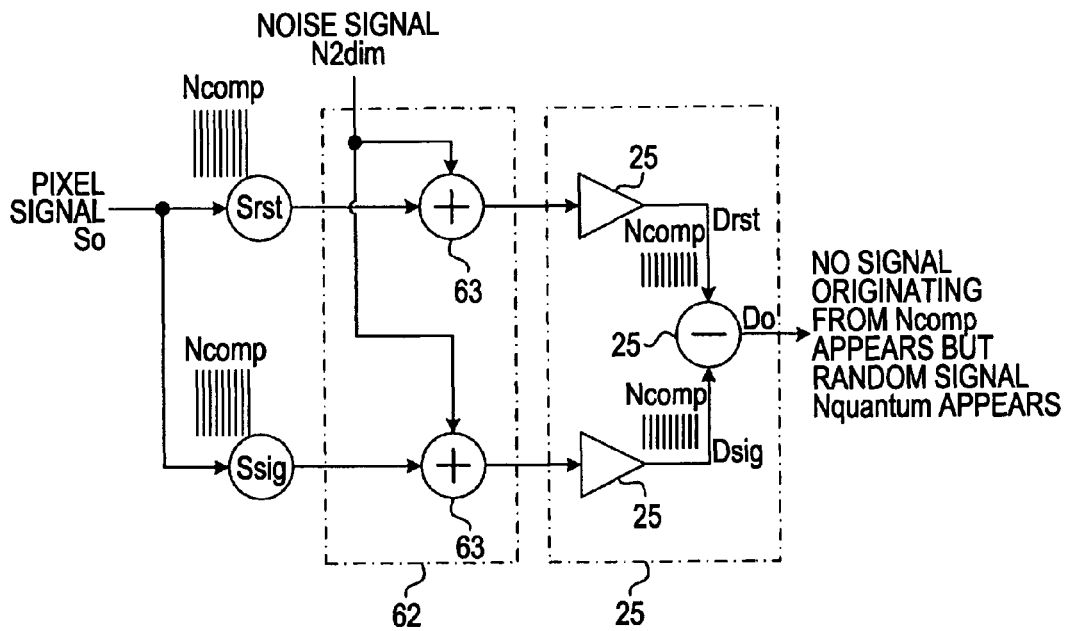
FIGS. 9A and 9B are functional diagrams illustrating a basic concept of a process of reducing vertical streak noise according to an embodiment of the present invention.
Figure 9B:
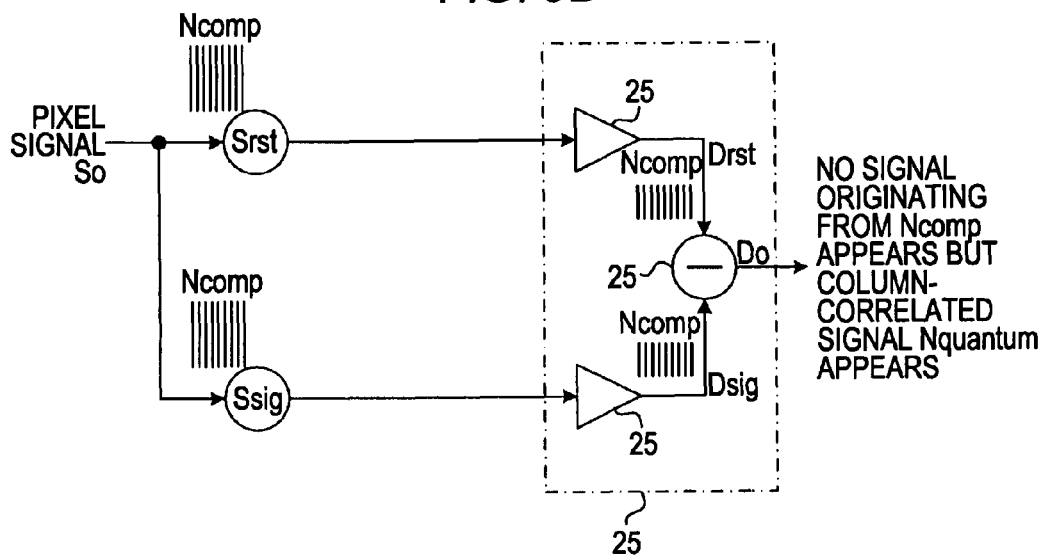
Figure 10A:
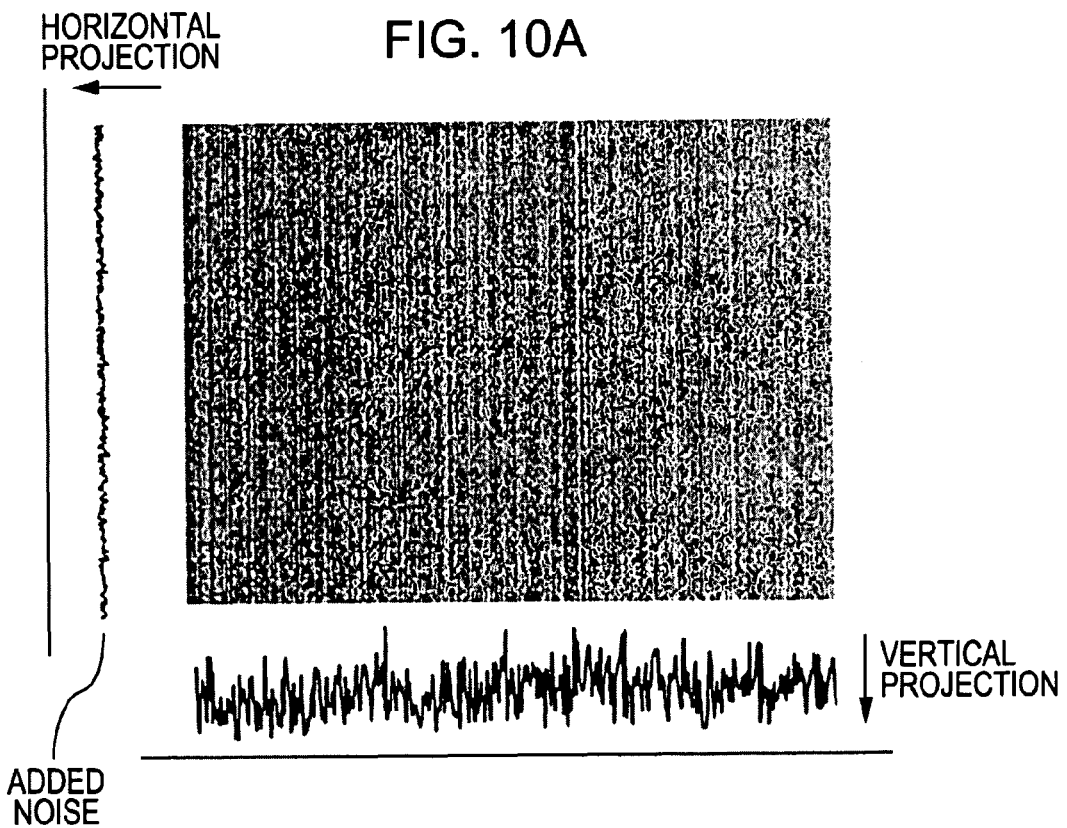
FIG. 10A illustrates, in the form of an image, a result of analog-to-digital conversion of a reset level without a noise reduction process.
Figure 10B:
FIG. 10B illustrates an image obtained after a noise reduction process according to an embodiment of the present is performed.

FIGS. 9A and 9B and FIGS. 10A and 10B illustrate a basic operation of the vertical streak noise reduction unit 60 disposed to suppress the vertical streak noise described above. FIGS. 9A and 9B are functional block diagrams illustrating a basic concept of a vertical noise reduction process according to the present embodiment of the invention. FIG. 10A illustrate, in the form of an image, digital data obtained as a result of the analog-to-digital conversion of reset levels Srst. FIG. 10B illustrates, in the form of an image, digital data obtained as a result of the difference extraction process including the vertical streak noise reduction process according to the present embodiment.

The vertical streak noise reduction unit 60 according to the present embodiment includes a noise adding unit 62, and a column analog-to-digital converter 25. Among various parts in the column analog-to-digital converter 25, the following parts have a contribution to the vertical streak noise reduction. They are an analog-to-digital converter 25*rst* adapted to perform analog-to-digital conversion for the reset level Srst of the pixel signal So, an analog-to-digital converter 25*sig* adapted to perform analog-to-digital conversion for the signal level Ssig, and a difference extractor 25*diff* adapted to extract the difference between the AD-converted digital value Drst of the reset level Srst and the AD-converted digital value Ssig of the signal level Ssig.

In FIG. 9A, for convenience of illustration, the noise reduction processing unit 60 includes two adders 63*rst* and 61*sig*, corresponding to analog-to-digital conversion operations performed separately for the reset level Srst and the signal level Ssig, for respectively processing the reset level Srst and the signal level Ssig. However, these two adders 63*rst* and 61*sig* are actually implemented by a single functional part adapted to process the pixel signal So output from the pixel cell 3. Similarly, two analog-to-digital converters 25*rst* and 25*sig* in the column analog-to-digital converter 25 shown in FIG. 9B are actually implemented by a signal functional part.

In the vertical streak noise reduction unit 60 according to the present embodiment, as shown in FIG. 9A, the noise adding unit 62 adds noise signal N2*dim*, which does not vary with time but which two-dimensionally varies depending on pixel locations, to the pixel signal So supplied from the pixel array unit 10 to the voltage comparator 252 in the column analog-to-digital converter 25 in the column processing unit 26.

Strictly speaking, the original pixel signal So itself does not include vertical streak noise, but vertical streak noise Ncomp occurs as a result of variations in inverting speed in the comparison process performed by the voltage comparator 252. However, in FIG. 9A, for convenience of illustration, the reset level Srst and the signal level Ssig of the pixel signal both include vertical streak noise Ncomp equivalent to noise actually generated in the analog-to-digital conversion operation of the voltage comparator 252.

The reset level Srst and the signal level Ssig including two-dimensional spatial noise N2*dim* added by the adders 63*rst* and 63*sig* of the noise adding unit 62 are respectively input to corresponding analog-to-digital converters 25*rst* and 25*sig* and converted into digital data Drst and Dsig. The difference extractor 25*diff* subtracts Drst from Sig. As a result, digital data Do of the signal component Vsig is obtained.

Because the vertical streak noise Ncomp generated in the voltage comparator 252 is equivalently and equally included in both the reset level Srst and the signal level Ssig, the vertical streak noise Ncomp is cancelled out when the difference between the reset level Srst and the signal level Ssig is extracted by the difference extractor 25*diff*. However, because the extraction of the difference by the difference extractor 25*diff* is performed in the digital domain, a quantization error occurs and appears as quantization noise Nquantum on an image.

When noise signal N2*dim* is not added by the adders 63*rst* and 63*sig*, as shown in FIG. 9B, the result of the difference extraction operation includes a quantization error ±0.5 LSBs dependent on columns. Because the quantization error depends on columns and varies from one column to another, quantization noise Nquantum in the form of vertical streaks appears.

If two-dimensional spatial noise (noise signal N2*dim*) which two-dimensionally varies depending on pixel locations is added to the reset level Srst when the reset level Srst is subjected to the analog-to-digital conversion, this noise is maintained when the signal level Ssig is subjected to the analog-to-digital conversion, and thus this noise is cancelled out when the difference is extracted buy the difference extractor 25*diff*. Also in this case, a quantization error occurs in the difference extraction process. However, the quantization error of ±0.5 LSB is randomly distributed in two-dimensional space, that is, the quantization error at each pixel is random and does have a fixed value depending on columns.

The image obtained after the difference extraction is performed in the digital domain includes quantization errors within ±0.5 LSBs as with the image shown in FIG. 8, but, as opposed to FIG. 8, the quantization errors are randomly distributed and thus the quantization noise Nquantum appearing in the image is random.

FIG. 10A illustrates, in the form of an image, the result of the analog-to-digital conversion of the reset level Srst. The image shown in FIG. 10A is similar that that shown in FIG. 6 except that the image shown in FIG. 10A includes additionally added two-dimensional random noise.

The image shown in FIG. 10A is similar to that shown in FIG. 6 in that the image includes column-dependent variations as can be seen from the vertically projected image, but, unlike the image shown in FIG. 6, the data value varies within a small range along each column as can be seen from the horizontally projected image.

Next, the image obtained as a result of the extraction of the difference between the digital data of the signal level and the digital data of the reset level Srst is discussed. Also in this case, quantization errors occur as described above with reference to FIG. 7. When the difference is extracted between the digital signal of the signal level and the digital signal of the reset level such as that shown in FIG. 6, the resultant data includes quantization errors which have values fixed to the respective columns. In contrast, when two-dimensionally random noise is added as shown in FIG. 10, the resultant data includes quantization errors which vary randomly within the range of ±0.5 LSBs from one pixel to another and which do not have values fixed to the respective columns.

Thus, although the image obtained after the difference extraction operation includes quantization errors within the range of ±0.5 LSBs as with the image shown in FIG. 8, the random distribution makes the vertical streak noise not perceptible at all, as shown in FIG. 10B.

As described above, the vertical streak noise caused by the quantization errors appearing after the difference extraction process can be reduced simply by adding two-dimensionally random noise to the reset level Srst which is cancelled out in the difference extraction process. The amount of residual noise remaining after the difference extraction process is within 0.5 LSBs regardless of whether two-dimensionally random noise is added or not. However, the great difference is in that randomly distributed noise does not give unnatural feeling to an audience, because human eyes are not very sensitive to random noise although human eyes are sensitive to a geometric pattern.

Because the two-dimensional spatial noise (noise signal N2*dim*), which is added to the pixel signal So before the analog-to-digital conversion is performed, equally appears in the reset level Srst and the signal level Ssig, the noise signal N2*dim* is cancelled out when the difference extraction is performed by the difference extractor 25*diff*, as with the vertical streak noise Ncomp which is generated in the voltage comparator 252 and equally appears in the reset level Srst and the signal level Ssig.

Because added noise is eliminated when the difference extraction (equivalent to the CDS process) is performed in the digital domain, the added noise does not cause degradation in image quality. In effect, the added two-dimensionally random noise has only a contribution to spatially randomizing of quantization errors which occur when the difference extraction is performed in the digital domain, and the added two-dimensionally random noise does not cause degradation in image quality as long as it does not vary with time, because it is eliminated when the difference extraction is performed. In this regard, the added two-dimensionally random noise is quite different from temporally random noise in that the temporally random noise is difficult to remove.

As can be understood from the above discussion, in the vertical streak noise reduction process according to the present embodiment, addition of two-dimensional spatial noise (noise signal N2*dim*) to the pixel signal So plays an essentially important role. Next, a method of adding two-dimensional spatial noise to the pixel signal So is discussed below.

As described above, some noise components remains after the voltage comparator 252 is reset by the comparator reset pulse PSET. An example of such noise components is kTC noise which occurs when the comparator reset pulse PSET is turned off. Another example is noise caused by column-to-column variations in inverting speed of the voltage comparators 252. kTC noise occurring when the comparator reset pulse PSET is turned off is two-dimensionally random.

As described above with reference to FIG. 5C, when the conversion gain is high enough, i.e., when the slope of the reference signal RAMP is small enough and thus the size of one LSB is small enough that the magnitude of kTC noise is greater than the size of one LSB, two-dimensionally random noise automatically intrudes into the reset level without needing an additional process or device. Thus, it is sufficient to intentionally add noise to the reset level only when the gain is low i.e., when the slope of the reference signal RAMP is large and thus the size of one LSB is great.

However, if temporally random noise such as thermal noise or shot noise is simply added to the pixel signal, the noise level at which the signal level is converted into digital data can be different from the noise level at a point of time at which the reset level is converted into digital data. In this case, the noise cannot be removed by the difference extraction process, and degradation in image quality can occur. This leads to a significant problem, in particular, when the gain is low and high image quality is expected. Thus, for the present purpose, it is desirable that added noise be two-dimensionally random but temporally unvarying.

In order to meet the requirement that added noise should be two-dimensionally random, it is desirable that two-dimensional fixed pattern noise be added to the reset level such that the noise level varies from one pixel to another.

In other words, the above requirement can be achieved by a mechanism of randomizing the reset level of the pixel signal input to the voltage comparator 252 of the column analog-to-digital converter 25 over the two-dimensional array of pixels. A specific example of a mechanism of randomizing the reset level of the pixel signal So over the two-dimensional space by adding two-dimensional spatial noise (noise signal N2*dim*) to the pixel signal So is described below.

Reset Level of Pixel Signal and Adding of Noise Thereto

Figure 11A:
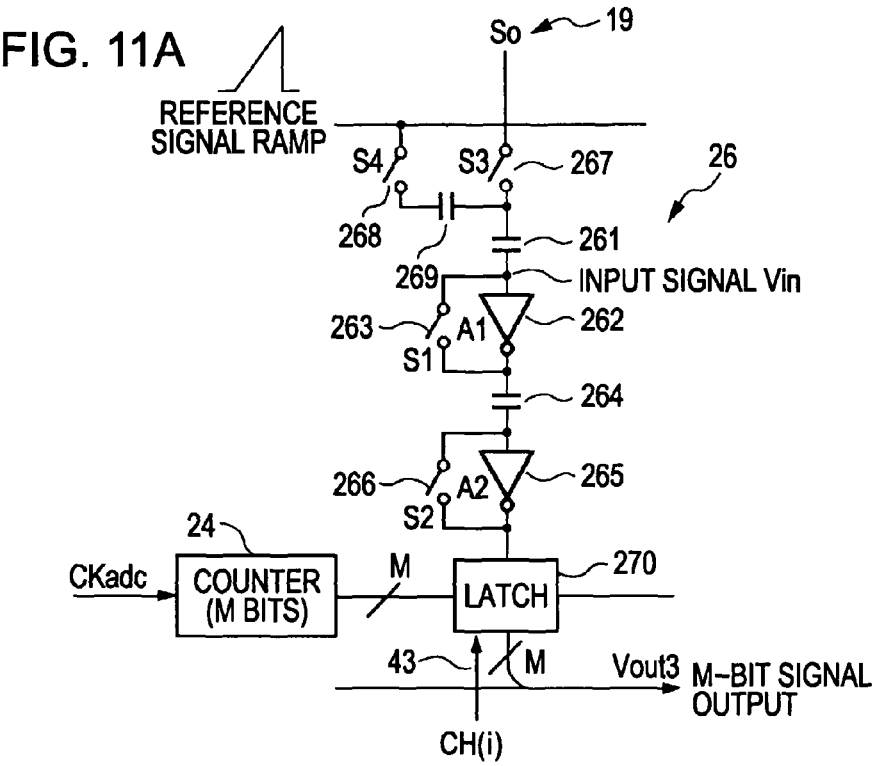
FIGS. 11A to 11C illustrate a reset level of an a pixel signal and a two-dimensional characteristic of noise applied to the reset level.
Figure 11B:
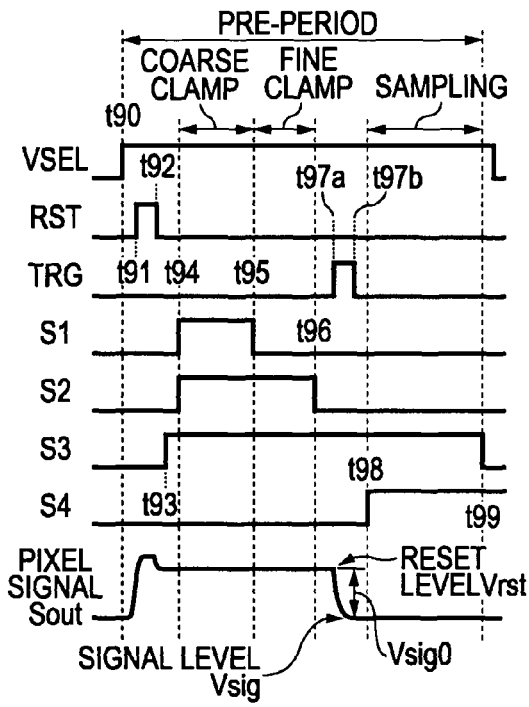
Figure 11C:
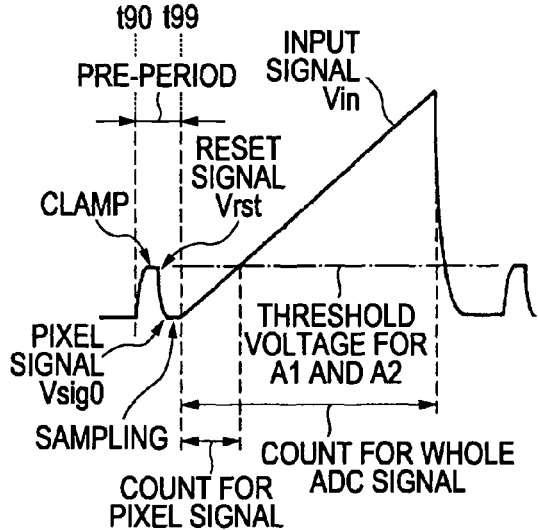

FIGS. 11A to 11C illustrate characteristics of the reset level of the pixel signal and two-dimensional spatial noise added to the reset level. In these figures, an example of a circuit configuration of the column analog-to-digital converter 25 having the analog-to-digital conversion function and associated peripheral circuits, and operation thereof are illustrated. Note that these figures are cited from "Fundamentals and Applications of CCD/CMOS Image Sensors: Principles, Structures, Operation Schemes, Characteristics, and Systems" (Kazuya YONEMOTO, Introduction-to-C&E Series, CQ Publishing Co. Ltd., p. 202).

In FIG. 1, for ease of understanding, the voltage comparator 262 has a differential input configuration. However, in practice, the analog-to-digital conversion using the single slope integration may be implemented in a wide variety of circuit configurations, some of which do not have a differential input configuration in the voltage comparator 262.

In the circuit shown in FIG. 11 (cited from "Fundamentals and Applications of CCD/CMOS Image Sensors: Principles, Structures, Operation Schemes, Characteristics, and Systems" (Kazuya YONEMOTO, Introduction-to-C&E Series, CQ Publishing Co. Ltd., p. 202)), a different analog-to-digital conversion scheme from that shown in FIG. 1 is used. However, there is no significant difference in operation principle.

In the circuit shown in FIG. 11A, a comparator is configured in the form of a chopper comparator including an inverter 262 with a switch 263 connected in parallel thereto between an input and an output, a capacitor 261 one end of which is connected to the input of the inverter 262 and the other end of which is connected to a switch 267 and to a switch 268 via a capacitor 269 whereby a signal voltage and a reference signal RAMP are alternately switched by the switches 268 and 267 and input to the inverter 262. One counter (CNT) 24 is shared by all vertical columns. For the above purpose, M-bit output of the counter 24 is supplied to all columns.

In each of the column ADCs disposed for the respective vertical signal lines 19 (vertical columns), the analog-to-digital converter converts a given pixel signal into a digital signal while suppressing fixed pattern noise of pixels. To suppress the fixed pattern noise, the column ADC clamps the reference signal.

As shown in FIG. 11A, the column ADC includes a two-stage clamp circuit (double-clamp circuit) including first and second clamp circuits to clamp the reset level of the pixel signal Vsig in the column ADC. The first clamp circuit is implemented by the capacitor 261, the amplifier 262, and the switch 263, and the second clamp circuit is implemented by a capacitor 264, an amplifier 265, and a switch 266.

The pixel signal Vsig supplied via the vertical signal line 19 is captured into to the double-clamp circuit via the switches 267 and 268 and the capacitor 269 disposed at the input of the double-clamp circuit. The output of the second clamp circuit is input to a latch 270 adapted to latch data.

Control pulses S1, S2, S3, and S4 are supplied from the horizontal scanning unit 12 to the respective switches 263, 266, 267, and 268 via control lines. A ramp-shaped reference signal RAMP generated by the reference signal generator 27 (not shown in FIG. 11A) is supplied as an analog-to-digital conversion reference signal (ADC reference signal) to one input terminal of the switch 268. The M-bit count value output from the counter 24 is supplied to the latch 270. The M-bit count value output from the counter 24 is also supplied in common to latches 270 in the other columns.

In this configuration, the pixel signal is converted into digital data as follows. First, the floating diffusion region 38 in the pixel cell 3 is reset to the power supply voltage by the pixel reset pulse RST. This reset level is amplified by the amplifying transistor 42 and converted into a voltage signal. The resultant voltage signal is output over the vertical signal line 19. Thereafter, the read selection transistor 34 is turned on by the read pulse (transfer pulse) TRG to transfer the signal charge from the photodiode or the like serving as the charge generator 32 to the floating diffusion region 38. The transferred signal charge is amplified by the amplifying transistor 42 and converted into a voltage signal. The resultant voltage signal indicating the signal level is output over the vertical signal line 19.

Referring to a timing chart shown in FIG. 11B, the operation of the column ADC is described in further detail below. In a pre-period t90 to t99 in which the selected row is switched by the vertical selection pulse VSEL, the reset signal Vrst of the pixel cell 3 is output over the vertical signal line 19 in response to the pixel reset pulse RST (t91 to t92), and clamped in the two clamp circuits in the column ADC in accordance with control pulses S1 and S2, as described in detail below.

First, the switch 267 is turned on (t93) and then the switches 263 and 266 of the amplifiers 262 and 266 are simultaneously closed (t94). Thereafter, when the switch 263 is opened (t95) while maintaining the switch 266 closed, the pixel signal Vsig is coarsely clamped at a voltage equal to the threshold voltage of the amplifier 262 plus a variation caused by a switching variation of the switch 263. At this stage of the process, because the switch 266 is maintained closed, the above voltage is set as the threshold voltage of the amplifier 265.

Thereafter, if the switch 266 is opened (t96), the voltage is clamped by the amplifier 265. In this clamping operation, the voltage has a fluctuation depending on a switching variation of the switch 266. A value equal to the switching variation component of the switch 266 divided by the gain of the amplifier 265 is fed back to the input signal applied to the amplifier 262. As a result, the clamping accuracy seen from the input of the amplifier 262 is improved.

Thus, the fixed pattern noise, which occurs in the clamp circuit and which can cause vertical streak noise, can be suppressed to a sufficiently low level. That is, the reset signal Vrst is clamped in a state in which variations from one clamp circuit to another are suppressed to a sufficiently low level.

Thereafter, in response to rising of transfer pulse TRG, a pixel signal Vsig0 appears on the vertical signal line 19 (t97a to t97b). The switch 268 is closed to sample the pixel signal Vsig0 (t98 to t99). If the sampling is completed, the switch 267 is opened to supply the reference signal RAMP as the ADC reference signal via the switch 268 (t99).

As the ramp-shaped reference signal RAMP gradually rises, the input signal Vin eventually becomes higher than the threshold voltage of the clamp circuit, and thus the output of the amplifier 265 is inverted. The count value of the M-bit counter at this point of time is employed as digital pixel data indicating the pixel signal and stored in the latch 270. Thus, the analog-to-digital conversion is completed. The pixel data Vout3 stored in the latch 270 is output to the outside of the column area and further to the outside of the chip of the solid-state image sensor 1 via a shift operation in response to the horizontal selection signal CH(i) supplied from the horizontal scanning unit 12 via the control line. That is, the pixel data Vout3 stored in the latch 270 in the respective columns are sequentially read out via the horizontal signal line 282 by scanning the horizontal shift register in the horizontal scanning unit 12.

Use of the column ADC configured in the above-described manner makes it possible to suppress the fixed pattern noise and also a variation in the DC component of the image signal to sufficiently low levels. That is, the column ADC also has the capability of suppressing the DC level.

As with the pixel signal So shown in FIG. 11B, the pixel signal So output from the pixel cell 3 has a highest voltage during a period in which the floating diffusion region 38 is reset by the pixel reset pulse RST. When the pixel reset pulse RST falls down (is turned off), noise called reset noise is generated, which causes the pixel signal So on the vertical signal line 19 to slightly drop down. The resultant voltage level is referred to as the reset level Srst. The signal level Vsig appears as the sum of the reset level Srst and the signal component Vsig0.

In general, reading of a pixel signal and an analog-to-digital conversion operation thereof are performed after a reset level on a vertical signal line 19 has settled enough. As opposed to the general scheme, if the analog-to-digital conversion of the reset level is performed before the reset level on the vertical signal line 19 has settled enough, a value different from the reset level in the settled state is subjected to the analog-to-digital conversion process.

As a result, reset noise intrudes into the result of the analog-to-digital conversion process. However, the magnitude of the reset noise varies from one pixel to another, and thus two-dimensionally random noise intrudes into the result of the analog-to-digital conversion of the reset level.

There are various methods of performing the analog-to-digital conversion in a state in which the reset level has not yet settled enough. A first method is to shift the timing of turning on/off driving pulses applied to the pixel cell 3 and the timing of releasing the voltage comparator 252 from the reset state from the normal timings.

More specifically, the interval between the timing of turning off the pixel reset pulse RST and the timing of turning off the comparator reset pulse PSET by which to reset the voltage comparator 252 (hereinafter, this interval will be referred to as a reset release interval TRelease) is reduced from a normal interval.

As a result of the reduction in the reset release interval TRelease, reset noise occurring in the resetting operation of the reset transistor 36 serving as the pixel resetting unit in the pixel cell 3 is partially injected as noise which remains without being eliminated by the offset elimination operation performed by the operating point resetting unit (offset eliminating unit) 330 in the voltage comparator 252.

Reducing of the reset release interval TRelease may be achieved, for example, as follows. After the operating point resetting unit 330 starts the operation of eliminating the offset of the voltage comparator 252, the pixel cell 3 is reset by the reset transistor 36 before the offset elimination operation is released, and the offset elimination operation by the operating point resetting unit 330 is released before reset noise occurring in the pixel resetting operation by the reset transistor 36 completely settles.

The reset release interval TRelease may be reduced by adjusting the pixel reset pulse RST or the comparator reset pulse PSET or both the pixel reset pulse RST and the pixel reset pulse RST.

A second method of performing the analog-to-digital conversion in a state in which the reset level has not yet completely settled is to reduce a bias current (read current supplied to pixel cells 3) supplied via each vertical signal line 19 from a normal value. A reduction in the bias current supplied to the vertical signal line 19 causes degradation in frequency characteristics of the operation of reading the pixel signal So to the column analog-to-digital converter 25. As a result, the time needed for the reset noise to settle is intentionally increased. This makes it possible to perform the analog-to-digital conversion in a state in which the reset level appearing on the vertical signal line 19 has not yet completely settled, without changing the timing of the pixel reset pulse RST or the comparator reset pulse PSET.

Specific examples of circuits implementing the above-described methods and operations of the circuits are described below.

Vertical Streak Noise Reduction According to First Embodiment

Figure 12:
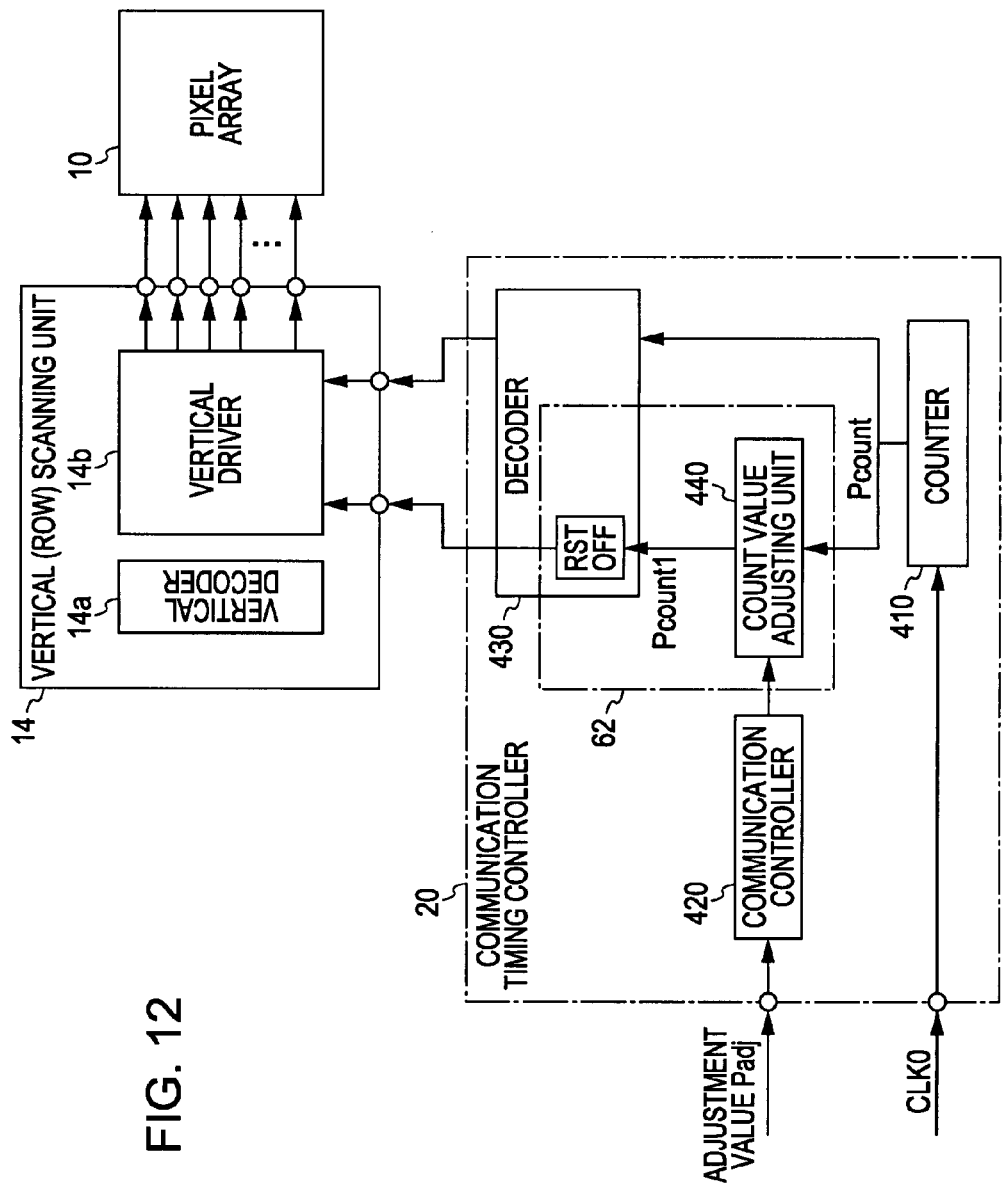
FIG. 12 is a circuit diagram of a noise adding unit in a vertical streak noise reduction unit according to an embodiment of the present invention.
Figure 13:
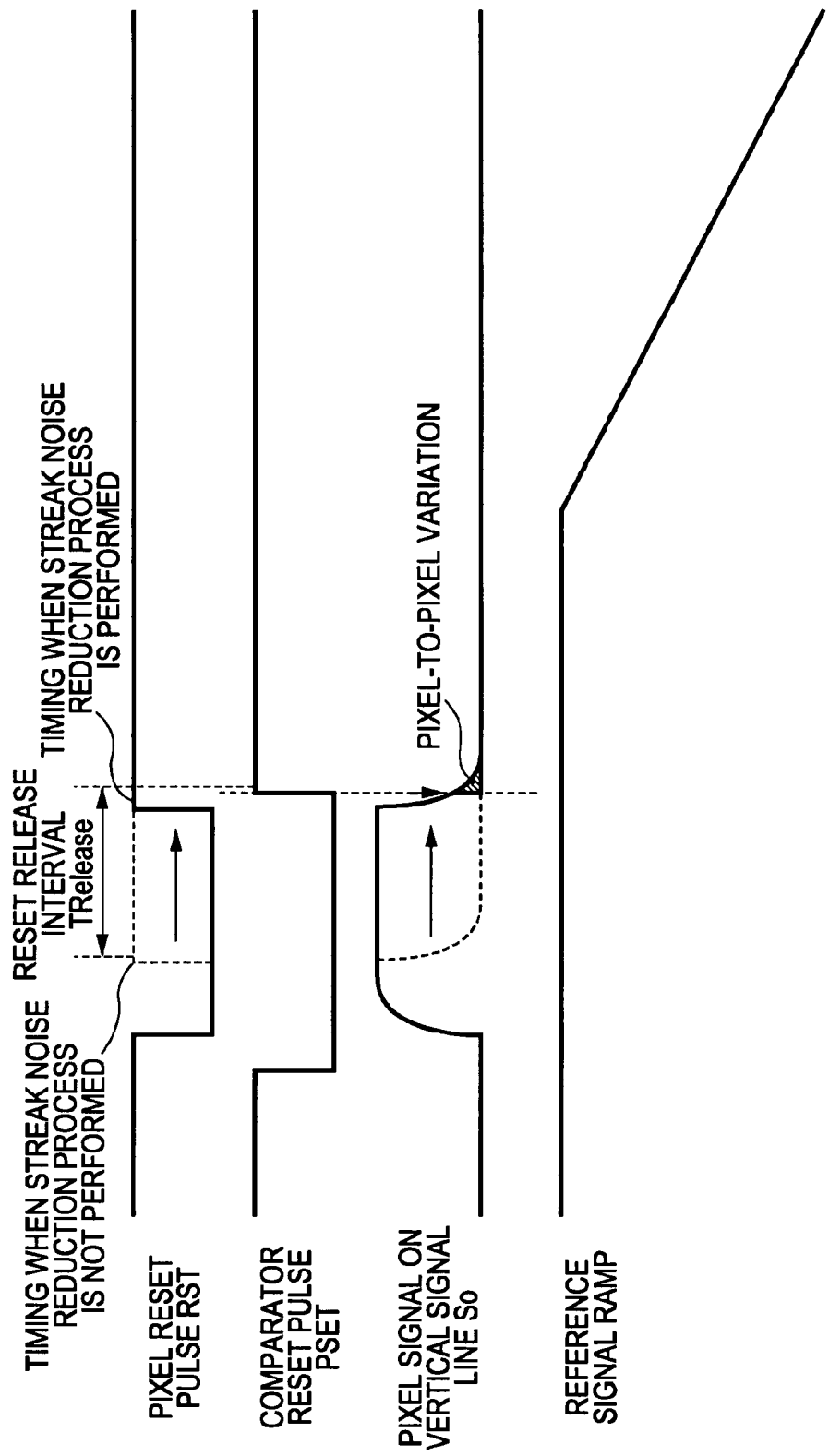
FIG. 13 is a diagram illustrating an operation of a noise adding unit according to an embodiment of the present invention.

FIGS. 12 and 13 are provided for explanation of a method of reducing streak noise according to a first embodiment. FIG. 12 is a circuit diagram of the noise adding unit 62 disposed in the vertical streak noise reduction unit 60 according to the first embodiment, and FIG. 13 illustrates the operation of the noise adding unit 62.

The first embodiment is characterized in that the reset release interval TRelease is reduced by adjusting the pixel reset pulse RST.

In the first embodiment, as shown in FIG. 12, the vertical streak noise reduction unit 60 is configured such that the noise adding unit 62 is included in the communication/timing controller 20. More specifically, the communication/timing controller 20 is configured in a similar manner to the conventional configuration, using a counter 410 adapted to count the number of master clock pulses CLK0 in synchronization with a horizontal synchronizing signal, a communication controller 420 adapted to communicate with a central control unit, and a decoder 430 adapted to determine the timing of turning on/off various driving pulses applied to respective pixel cells 3.

The decoder 430 changes the signals levels of driving pulses to L or H levels in accordance with the pulse count value Pcount supplied from the counter 410 and in accordance with the address values Paddress internally set to define the timing of turning on/off the driving pulses. That is, the decoder 430 decodes the count value of the counter 410 and generates drive pulses according to the timing determined by the address value Paddress.

The communication/timing controller 20 is characterized in that it has an a count value adjustment unit 440 which is an essential part of the first embodiment and which is adapted to adjust the timing of turning off the pixel reset pulse RST to reduce the reset release interval TRelease. The count value adjustment unit 440 may be implemented by a subtractor and an adder.

The count value adjustment unit 440 subtracts or adds the adjustment value Padj (pulse position offset) specified via the communication controller 420 from or to the pulse count value Pcount supplied from the counter 410, and supplies the resultant adjusted count value Pcount1 to the decoder 430. Whether the adjustment value Padj is to be subtracted or added from or to the pulse count value Pcount is determined in advance, and the adjustment value Padj is set depending on the determination.

The decoder 430 determines the timing of turning off the pixel reset pulse RST not in accordance with the pulse count value Pcount supplied from the counter 410 but in accordance with the adjusted pulse count value Pcount1 supplied from the count value adjustment unit 440. Furthermore, in accordance with the address value Paddress internally set to define the timing of turning off the pixel reset pulse RST, the decoder 430 turns off the pixel reset pulse RST (into the H level, in the present embodiment).

More specifically, when the decoder 430 raises up the pixel reset pulse RST in accordance with the pulse count value Pcount, the pulse count value Pcount is offset by the adjustment value given by the count value adjustment unit 440, and thus the timing of raising up the pixel reset pulse RST is shifted.

In the first embodiment, the noise adding unit 62 is formed by the count value adjustment unit 440 and the functional part in the decoder 430 to generate (turn off) the pixel reset pulse RST.

The setting of the adjustment value Padj by the count value adjustment unit 440 is performed in accordance with setting information supplied via the communication controller 420. This makes it possible to flexibly control the timing of turning off the pixel reset pulse RST depending on the state of the solid-state image sensor 1 by externally controlling the adjustment value Padj, even if the timing of turning off the pixel reset pulse RST (into the H level, in the present embodiment) is internally defined by the address value Paddress.

In contrast, in the conventional technique, the driving timing is controlled such that, as shown by broken lines in FIG. 13, after the pixel reset pulse RST is input, when the reset noise component appearing on the vertical signal line 19 becomes stable, the comparator reset pulse PSET applied to the voltage comparator 252 is turned off so that the offset component of the pixel signal So is completely removed. In contrast, in the present embodiment, the timing of turning off the pixel reset pulse RST is intentionally shifted to a temporally delayed point thereby reducing the reset release interval TRelease.

This intentionally causes the voltage comparator 252 to be released from the reset state at a time at which the reset noise has not yet reached a stable state. That is, it is possible to inject two-dimensionally random noise by controlling the pulse width of the pixel reset pulse RST thereby controlling the settling amount of the reset noise of each pixel.

As a result, the reset noise which has not yet reached to the settled state intrudes into the result of the analog-to-digital conversion of the reset level. Because the magnitude of reset noise varies depending on the pixels, two-dimensionally random noise is added to the result of the analog-to-digital conversion of the reset level.

When a sufficient period has elapsed since the voltage comparator 252 was released from the rest state, the ramp-shaped reference signal RAMP is started (that is, the analog-to-digital conversion is started) so that the reset noise on the vertical signal line 19 is completely settled thereby preventing the reset level from changing between at the time when the analog-to-digital conversion is performed for the reset level and at the time when the analog-to-digital conversion is performed for the signal level, and thus preventing the result from having undesirable ransom noise which can cause degradation in image quality.

Thus, in effect, after two-dimensionally random fixed pattern noise is added to the reset level and the signal level of the pixel signal, the reset level and the signal level including the added noise are converted into digital data, and the difference between the digital data of the reset level and the digital data of the signal level is extracted, thereby acquiring the digital data of the signal component in the state in which the quantization errors occurring in the difference extraction operation are randomized over the two-dimensional space.

This technique according to the present embodiment makes it possible to prevent the digital data of the signal component from having column-dependent quantization errors in the form of vertical streaks, even when the resolution of the analog-to-digital conversion is low.

In this technique according to the present embodiment, two-dimensional spatial noise is added to the pixel signal by controlling the timing of turning on/off the driving pulse which drives the pixel signal (the timing of turning off the pixel reset pulse RST, in the present embodiment) to reduce the reset release interval TRelease such that the voltage comparator 252 is released from the reset state before the reset level becomes settled. That is, two-dimensional spatial noise is added to the pixel signal by using reset noise of the pixel itself without having to use an additional special device such as a random number generator. Thus, no increase in circuit complexity occurs.

Furthermore, the dependence of noise on the columns is substantially completely randomized by the added noise, and the resultant final image is very natural for audiences. The two-dimensionally random noise added to the pixel signal remains in the digital data obtained as a result of the analog-to-digital conversion, and thus the final image includes this two-dimensional random noise. However, human eyes are not very sensitive to random noise, and no significant problem due to such random noise occurs. As a matter of course, if the added random noise is removed by using the CDS processing function of the column processing unit 26, a further better image can be obtained.

The noise added to the reset level is maintained until the analog-to-digital conversion is performed for the signal level, that is, until the second-time analog-to-digital conversion process, in which the signal level is converted into digital data and the difference extraction corresponding to the CDS process is performed, is completed. This means that the added noise is temporally unvarying, and the added noise itself can be removed via the difference extraction process, and thus, unlike a dithering technique widely used in the art, increasing in random noise does not occur.

Because the noise is added by controlling the pulse width of the pixel reset pulse RST thereby controlling the settling degree of the reset noise of the pixel, it is possible to precisely control the magnitude of noise added. This is because the pulse width of the pixel reset pulse RST or the reset release interval TRelease can be easily controlled by controlling the adjustment value Padj supplied to the count value adjustment unit 440.

Furthermore, the reset release interval TRelease can be flexibly controlled depending on the state of the solid-state image sensor 1, for example, such that noise is generated in the operation of eliminating the offset of the voltage comparator 252, but signals are completely settled in the analog-to-digital conversion operation.

Streak Noise Reduction According to Second Embodiment

Figure 14:
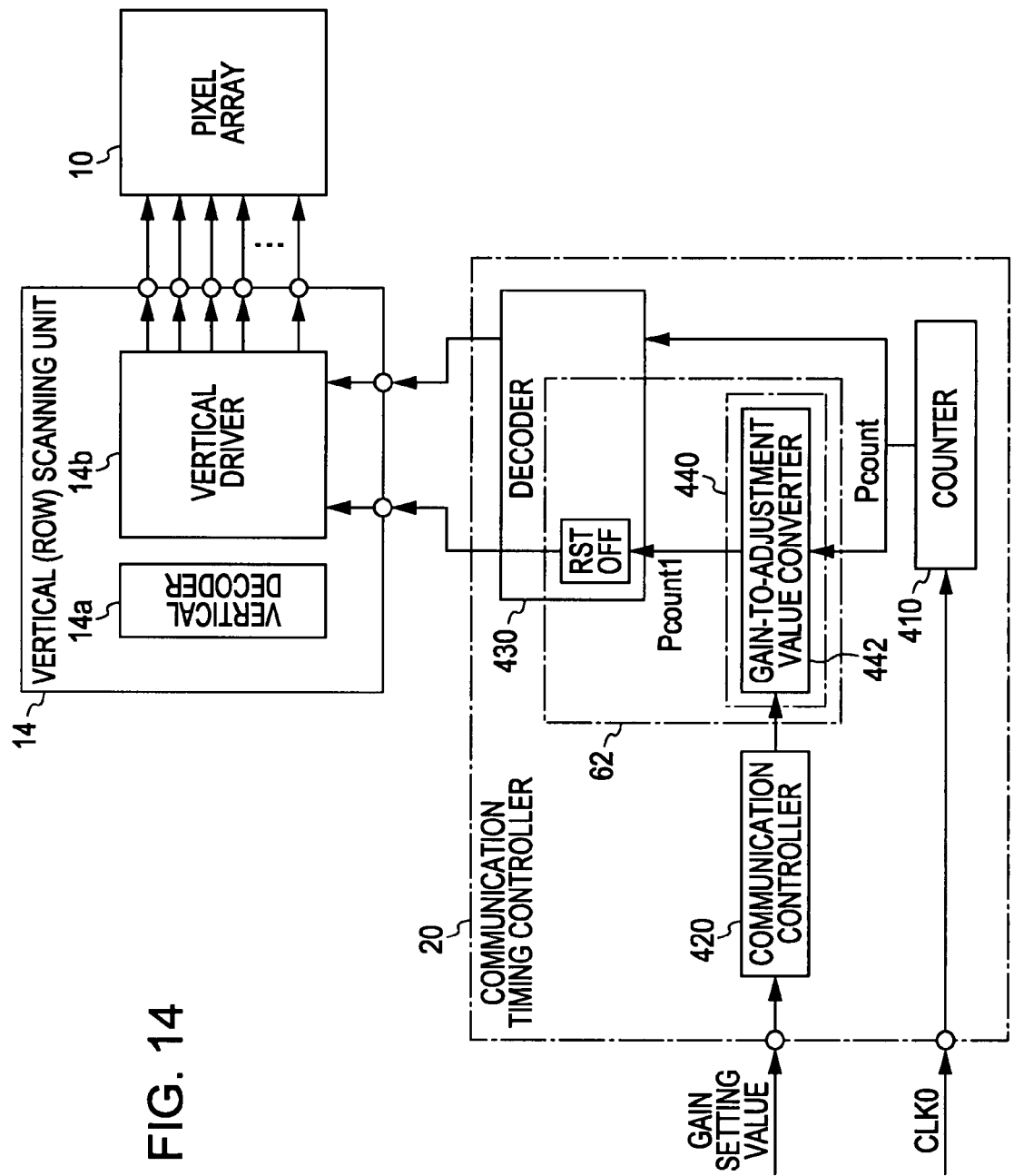
FIG. 14 is a circuit diagram of a noise adding unit included in a vertical streak noise reduction unit according to an embodiment of the present invention.
Figure 15:
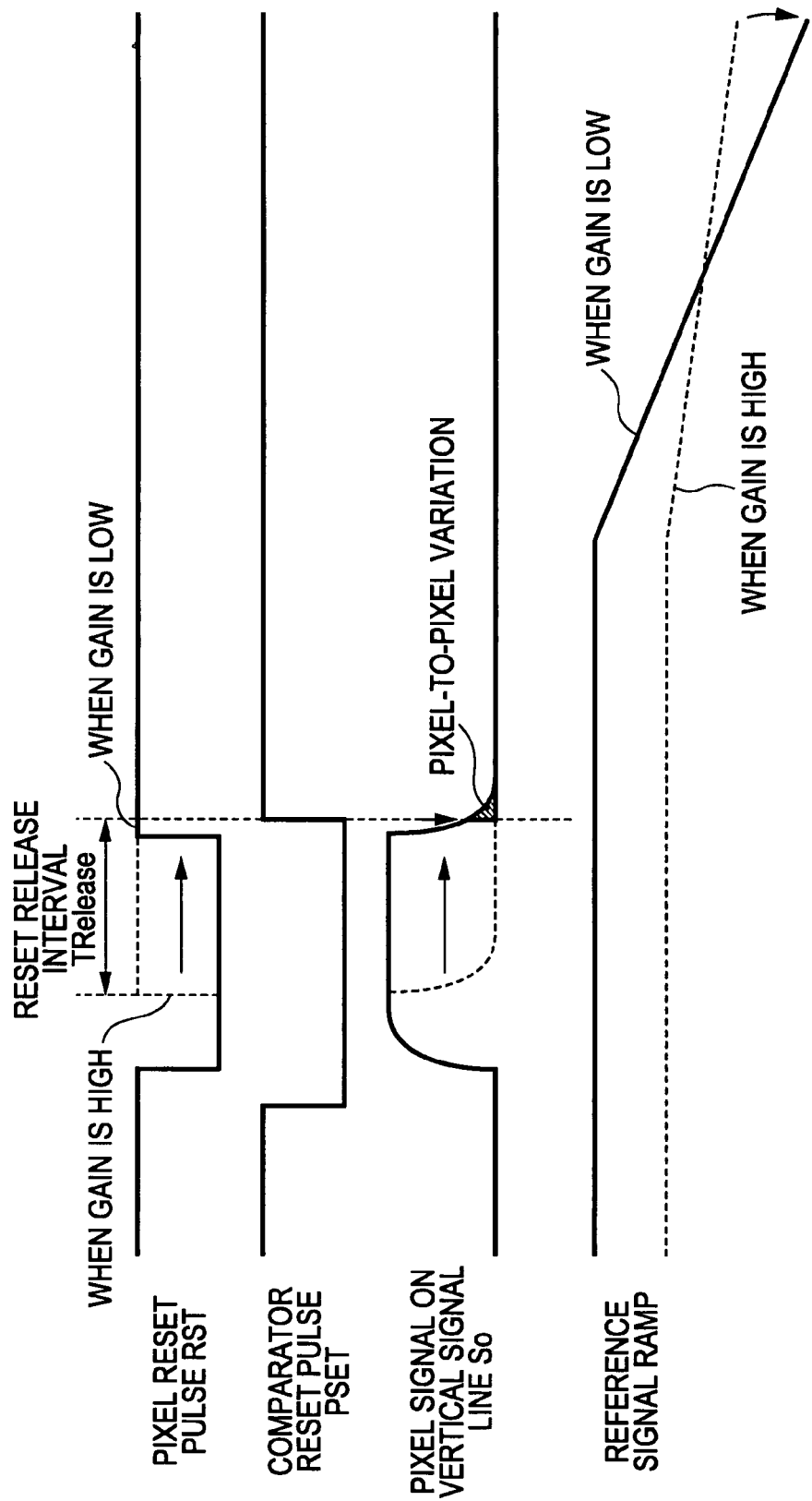
FIG. 15 is a diagram illustrating an operation of a noise adding unit according to an embodiment of the present invention.

FIGS. 14 and 15 are provided for explanation of a method of reducing streak noise according to a second embodiment. FIG. 14 is a circuit diagram of the noise adding unit 62 disposed in the vertical streak noise reduction unit 60 according to the second embodiment, and FIG. 15 illustrates the operation of the noise adding unit 62.

The second embodiment is similar to the first embodiment described above in that the reset release interval TRelease is reduced by adjusting the pixel reset pulse RST. However, the difference is in that the adjustment amount is controlled depending on the analog-to-digital conversion gain.

In the technique according to the first embodiment, the reset release interval TRelease is reduced from the normal length. However, simply use of this technique results in an increase in the variation of the reset level due to the added noise component, which can cause the analog-to-digital conversion for the reset level to become unreliable. In particular, because the amplitude of the reference signal RAMP is set to be small for the analog-to-digital conversion of the reset level compared with the amplitude used in the analog-to-digital conversion of the signal level, there is a possibility that the pixel signal exceeds the allowable range with respect to the reference signal RAMP in the analog-to-digital conversion of the reset level, and thus the analog-to-digital conversion is not performed correctly.

In the first-time reading and analog-to-digital conversion operation for the reset component of the pixel signal, as described above with reference to FIG. 5, the variation in the reset component $\Delta V$ is generally small, and the reset level Srst is similar for all pixels, and thus the output value for the reset component $\Delta V$ of the pixel signal voltage Vx on any vertical signal line 19 falls within a predictable narrow range. Therefore, in the first-time reading operation of the reset component $\Delta V$ it is allowed to set the down-count period (the comparison period t10 to t14) to be small by adjusting the reference signal RAMP.

However, an increase in variation in reset level brings about a need to handle the variation in the comparison process, and it becomes necessary to increase the comparison time in the first-time operation.

For example, as described above with reference to FIG. 5, when the analog-to-digital conversion gain is set to be high, that is, when the slope of the reference signal RAMP is set to small such that the size of one LSB becomes small, the amplitude of the reference signal RAMP becomes small, and thus the probability increases that the above-described problem occurs.

As can be seen from FIG. 5C, when the analog-to-digital conversion gain is set to be high, kTC noise or the noise component of the voltage comparator 252 itself becomes large compared with the size of one LSB, and thus random noise occurs in the result of the analog-to-digital conversion of the reset level. This automatically prevents the column-correlated quantum errors from occurring.

In view of the above, the vertical streak noise reduction unit 60 according to the second embodiment is configured to inject noise using reset noise, depending on the setting of the analog-to-digital conversion gain. More specifically, the reset release interval TRelease is adjusted depending on the analog-to-digital conversion gain such that the amount of reducing the reset release interval TRelease is increased with reducing analog-to-digital conversion gain.

FIG. 14 illustrates the vertical streak noise reduction unit 60 and associated circuit elements according to the second embodiment. The vertical streak noise reduction unit 60 according to the second embodiment is similar to that according to the first embodiment except that control information associated with the analog-to-digital conversion gain is supplied to the count value adjustment unit 440 via the communication controller 420, and the count value adjustment unit 440 sets the adjustment value Padj in accordance with the control information associated with the analog-to-digital conversion gain so that the timing of turning off the pixel reset pulse RST is adjusted depending on the analog-to-digital conversion gain.

The count value adjustment unit 440 includes a gain-to-adjustment value converter 442 adapted to determine the adjustment value Padj corresponding to the gain notified via the communication controller 420.

The gain-to-adjustment value converter 442 converts an input value indicating the analog-to-digital conversion gain into an adjustment value Padj in accordance with a predefined conversion formula or a lookup table LUT in which the relationship between the analog-to-digital conversion gain and the adjustment value Padj is defined. Use of the conversion formula or the lookup table LUT makes it possible to precisely control noise injection depending on the analog-to-digital conversion gain without having to use a complicated circuit.

The adjustment value Padj may be changed continuously with the analog-to-digital conversion gain so that the pulse position is controlled continuously, or the adjustment value Padj may be changed stepwise so that the pulse position is controlled stepwise.

When the conversion formula is used, it is easy to continuously change the adjustment value Padj. In contrast, the method using the lookup table LUT is suitable when the adjustment value Padj is changed stepwise. In the method using the lookup table LUT, it is possible to change the adjustment value Padj substantially continuously by determining a value, which is not included in the lookup table, by interpolation. As a matter of course, it is possible to change the adjustment value Padj stepwise using a conversion formula.

The count value adjustment unit 440 subtracts or adds the adjustment value Padj (the pulse position offset value) determined by the gain-to-adjustment value converter 442 depending on the analog-to-digital conversion gain from or to the pulse count value Pcount supplied from the counter 410 using a subtractor or an adder, and supplies the resultant adjusted pulse count value to the decoder 430. That is, the count value adjustment unit 440 offsets the count value depending on the analog-to-digital converter gain.

As described above, in the operation of injecting noise, the reset release interval TRelease can be adjusted depending on the analog-to-digital conversion gain by intentionally shifting the timing of turning off the pixel reset pulse RST to a temporally delayed point by an amount determined depending on the analog-to-digital conversion gain.

More specifically, when the slope of the reference signal RAMP is small as with a reference signal RAMP represented by a solid line in FIG. 15 and thus when the analog-to-digital conversion gain is low, the operation is performed such that, to prevent non-randomized quantization errors from occurring, the width of the pixel reset pulse RST is increased so that the rising edge of the pixel reset pulse RST comes closer to the rising edge of the comparator reset pulse PSET, i.e., the reset release interval TRelease is reduced so that the voltage comparator 252 is turned off by the comparator reset pulse PSET before reset noise appearing on the vertical signal line 19 settles, thereby intentionally injecting reset noise.

On other hand, when the slope of the reference signal RAMP is large as with a reference signal RAMP represented by a broken line in FIG. 15 and thus when the analog-to-digital conversion gain is high, the reset release interval TRelease is controlled such that the high reliability of the analog-to-digital conversion has high priority. More specifically, the width of the pixel reset pulse RST reduced so that the reset release interval TRelease has a length close to a normal length and so that the voltage comparator 252 is turned off by the comparator reset pulse PSET after reset noise has settled enough.

The two states described above are continuously changed by continuously controlling the width of the pixel reset pulse RST (in other words, the reset release interval TRelease) depending on the analog-to-digital conversion gain or stepwise changed by stepwise controlling the width of the pixel reset pulse RST depending on the analog-to-digital conversion gain.

Thus, it is possible to easily control the noise injection depending on the analog-to-digital conversion gain such that noise is generated in the operation of eliminating the offset of the voltage comparator 252, but the voltage comparator 252 is completely settled in the analog-to-digital conversion operation.

Streak Noise Reduction According to Third Embodiment

Figure 16:
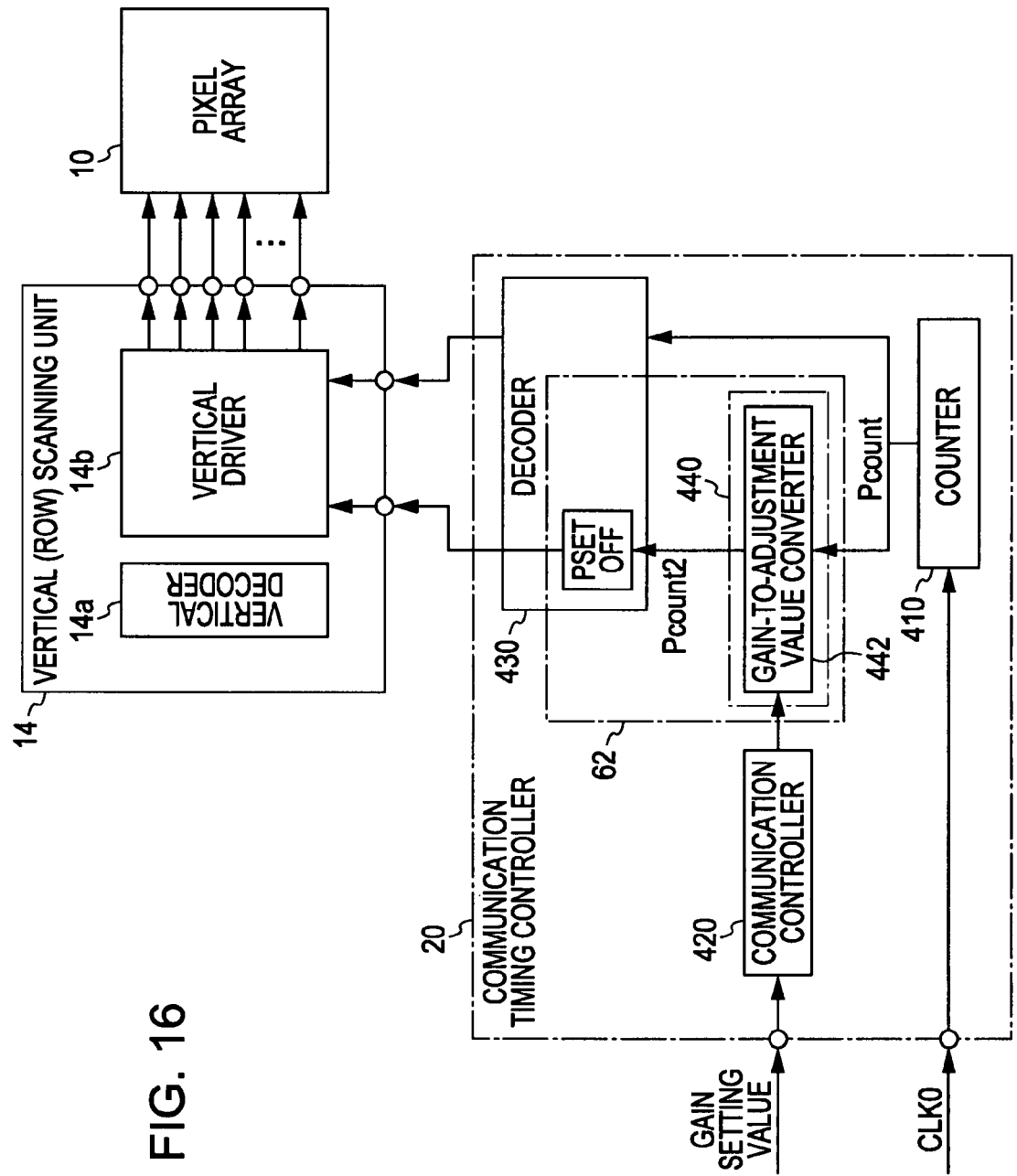
FIG. 16 is a circuit diagram of a noise adding unit included in a vertical streak noise reduction unit according to an embodiment of the present invention.
Figure 17:
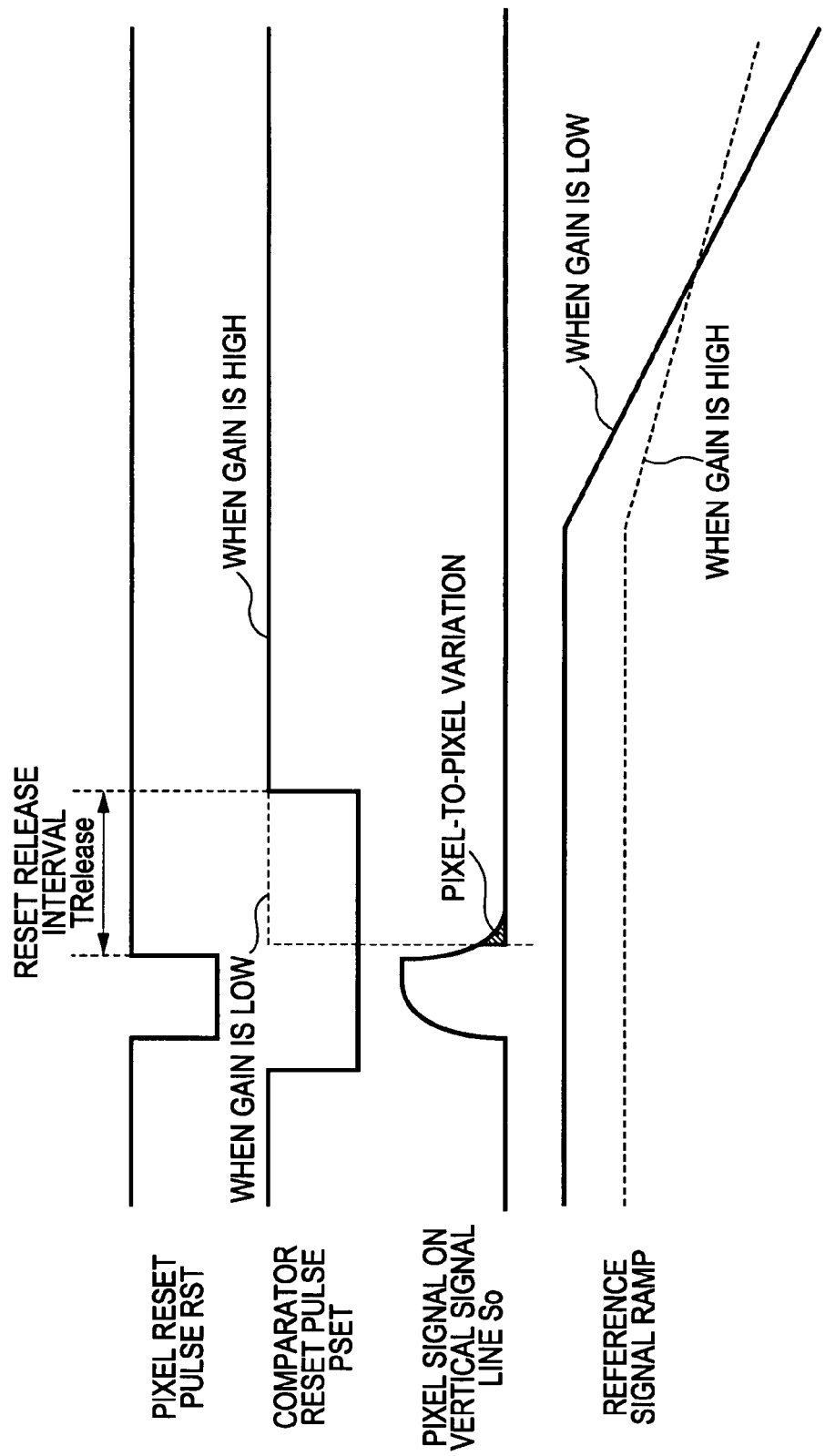
FIG. 17 is a diagram illustrating an operation of a noise adding unit according to an embodiment of the present invention.

FIGS. 16 and 17 are provided for explanation of a method of reducing streak noise according to a third embodiment. FIG. 16 is a circuit diagram of the noise adding unit 62 disposed in the vertical streak noise reduction unit 60 according to the third embodiment, and FIG. 17 illustrates the operation of the noise adding unit 62.

The third embodiment is characterized in that the reset release interval TRelease is reduced by adjusting the comparator reset pulse PSET. In the following discussion, by way of example, the reset release interval TRelease is adjusted depending on the analog-to-digital conversion gain as in the second embodiment. Note that the reset release interval TRelease may be adjusted independently of the analog-to-digital conversion gain as in the first embodiment.

FIG. 16 illustrates the vertical streak noise reduction unit 60 and associated circuit elements according to the third embodiment. The vertical streak noise reduction unit 60 according to the third embodiment is similar to that according to the second embodiment except that control information associated with the analog-to-digital conversion gain is supplied to the count value adjustment unit 440 via the communication controller 420, and the count value adjustment unit 440 sets the adjustment value Padj in accordance with the control information associated with the analog-to-digital conversion gain so that the timing of turning off the comparator reset pulse PSET is adjusted depending on the analog-to-digital conversion gain.

The count value adjustment unit 440 subtracts or adds the adjustment value Padj (the pulse position offset value) determined by the gain-to-adjustment value converter 442 depending on the analog-to-digital conversion gain from or to the pulse count value Pcount supplied from the counter 410 using a subtractor or an adder, and supplies the resultant adjusted count value Pcount2 to the decoder 430. That is, the count value adjustment unit 440 offsets the count value depending on the analog-to-digital converter gain.

The decoder 430 determines the timing of turning off the comparator reset pulse PSET not in accordance with the pulse count value Pcount supplied from the counter 410 but in accordance with the adjusted pulse count value Pcount2 supplied from the count value adjustment unit 440. Furthermore, in accordance with the address value Paddress internally set to define the timing of turning off the comparator reset pulse PSET, the decoder 430 turns off the comparator reset pulse PSET (into the H level, in the present embodiment).

More specifically, when the decoder 430 raises up the comparator reset pulse PSET in accordance with the pulse count value Pcount, the pulse count value Pcount is offset by the adjustment value given by the count value adjustment unit 440, and thus the timing of raising up the comparator reset pulse PSET is shifted.

In the third embodiment, the noise adding unit 62 is formed by the count value adjustment unit 440 and the functional part in the decoder 430 to generate (turn off) the comparator reset pulse PSET.

As described above, in the operation of injecting noise, the reset release interval TRelease can be adjusted depending on the analog-to-digital conversion gain by intentionally shifting the timing of turning off the comparator reset pulse PSET to a temporally forward point by an amount determined depending on the analog-to-digital conversion gain.

More specifically, when the slope of the reference signal RAMP is small as with a reference signal RAMP represented by a solid line in FIG. 17 and thus when the analog-to-digital conversion gain is low, the operation is performed such that, to prevent non-randomized quantization errors from occurring, the width of the comparator reset pulse PSET is reduced so that the rising edge of the comparator reset pulse PSET comes closer to the rising edge of the pixel reset pulse RST, i.e., the reset release interval TRelease is reduced so that the voltage comparator 252 is turned off by the comparator reset pulse PSET before reset noise appearing on the vertical signal line 19 settles, thereby intentionally injecting reset noise.

On other hand, when the slope of the reference signal RAMP is large as with a reference signal RAMP represented by a broken line in FIG. 17 and thus when the analog-to-digital conversion gain is high, the reset release interval TRelease is controlled such that the high reliability of the analog-to-digital conversion has high priority. More specifically, the width of the comparator reset pulse PSET reduced so that the reset release interval TRelease has a length close to a normal length and so that the voltage comparator 252 is turned off by the comparator reset pulse PSET after reset noise has settled enough.

The two states described above are continuously changed by continuously controlling the width of the comparator reset pulse PSET (in other words, the reset release interval TRelease) depending on the analog-to-digital conversion gain or stepwise changed by stepwise controlling the width of the comparator reset pulse PSET depending on the analog-to-digital conversion gain.

Although the third embodiment described above is different from the second embodiment in that the comparator reset pulse PSET is controlled instead of the pixel reset pulse RST and the pulse width is changed in opposite directions depending on the analog-to-digital conversion gain to the directions in the second embodiment, it is possible to easily control the noise injection depending on the analog-to-digital conversion gain such that noise is generated in the operation of eliminating the offset of the voltage comparator 252, but the voltage comparator 252 is completely settled in the analog-to-digital conversion operation.

Although the third embodiment is different from the second embodiment in that the reset release interval TRelease is adjusted not by the pixel reset pulse RST but by the comparator reset pulse PSET, these two embodiments are very similar in the mechanism of injection noise such that reset noise occurring in the resetting operation by the pixel resetting unit (the reset transistor 36) is partially injected as noise which remains without being eliminated by the offset elimination operation performed by the offset eliminating unit (operating point resetting unit) 330, and in the mechanism of adjusting the reset release interval between the time at which the resetting operation of the pixel resetting unit (reset transistor 36) for the pixel cell 3 is released to the time at which the offset elimination operation of the offset eliminating unit (operating point resetting unit 330) is released.

The resetting operation in accordance with the comparator reset pulse PSET eliminates the column-to-column variation (variation, for example, of the input offset which is not dependent on the inverting speed) of the voltage comparators 252 disposed for the respective columns. Therefore, if the active period (L-level period, in the present embodiment) of the comparator reset pulse PSET is set to be too small, the column-to-column variation is not completely eliminated, and there is a possibility that a significant column-to-column variation of the voltage comparator 252 occurs.

On the other hand, the pixel reset pulse RST directly acts on the respective pixel cell 3 arranged in the form of a two-dimensional array, and thus the pixel reset pulse RST does not create a column-dependent variation.

From the point of view discussed above, adjustment of the reset release interval TRelease using the pixel reset pulse RST is more advantageous in that two-dimensionally random noise can be injected without increasing column-dependent variation.

Streak Noise Reduction According to Fourth Embodiment

Figure 18:
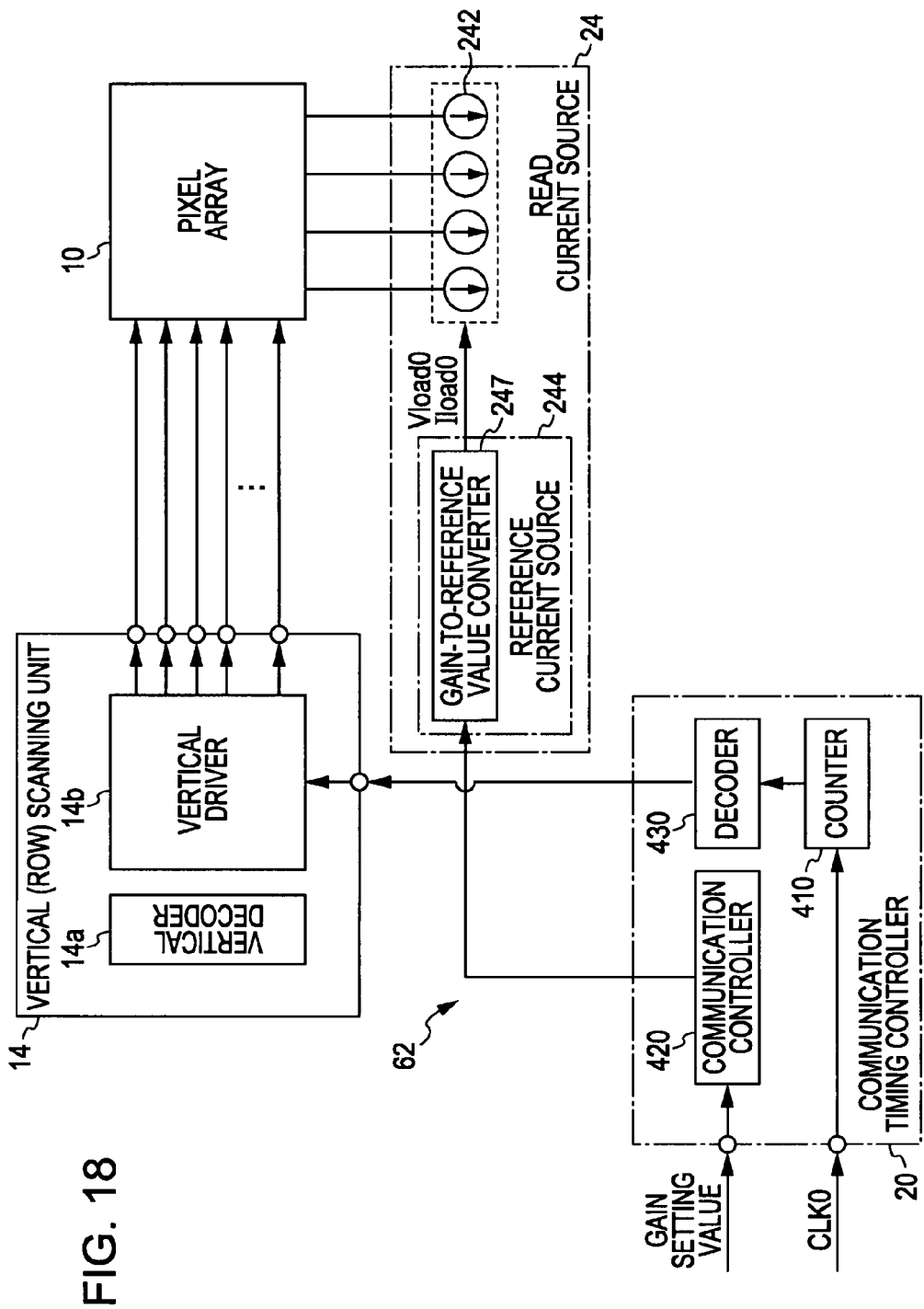
FIG. 18 is a circuit diagram of a noise adding unit included in a vertical streak noise reduction unit according to an embodiment of the present invention.
Figure 19:
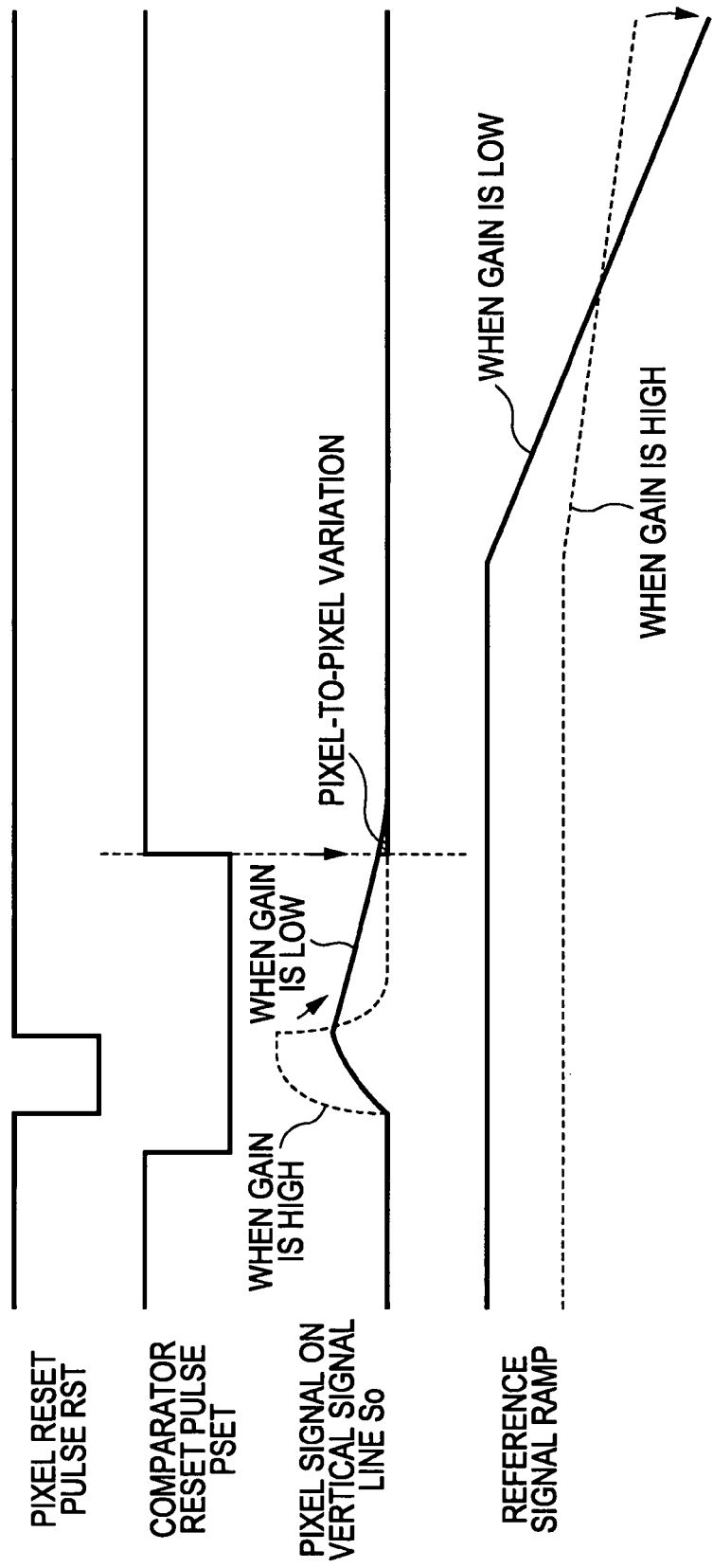
FIG. 19 is a diagram illustrating an operation of a noise adding unit according to an embodiment of the present invention.

FIGS. 18 and 19 are provided for explanation of a method of reducing streak noise according to a fourth embodiment. FIG. 18 is a circuit diagram of the noise adding unit 62 disposed in the vertical streak noise reduction unit 60 according to the fourth embodiment, and FIG. 19 illustrates the operation of the noise adding unit 62.

The fourth embodiment is characterized in that the bias current (the read current applied to each pixel cell 3) applied to each vertical signal line 19 is set to be lower than a value generally employed. In the following explanation, by way of example, the read current is adjusted in synchronization with the analog-to-digital conversion gain as in the second or third embodiment. Note that the fourth embodiment is also applicable to a configuration in which the read current is determined independently of the analog-to-digital conversion gain as in the first embodiment.

In the vertical streak noise reduction unit 60 according to the fourth embodiment, as shown in FIG. 18, the noise adding unit 62 is implemented by a function of controlling the read current supplied from the read current source 24 depending on the analog-to-digital conversion gain.

More specifically, the transistors 242 serving as the pixel source followers associated with the pixel array unit 10 outputs constant currents with reference to a reference voltage (or a reference current) supplied from the reference current source 244 serving as the reference current generator.

Control information associated with the analog-to-digital conversion gain is supplied to the reference current source 244 via the communication controller 420. In accordance with the control information, the reference voltage Vload0 (or the reference current Iload0) is varied depending on the analog-to-digital conversion gain.

The reference current source 244 includes a gain-to-reference value converter 247 adapted to determine the reference voltage Vload0 (or the reference current Iload0) corresponding to the analog-to-digital conversion gain notified via the communication controller 420.

The gain-to-reference value converter 247 converts an input value indicating the analog-to-digital conversion gain into a value of the reference voltage Vload0 (or the reference current Iload0) in accordance with a predefined conversion formula or a lookup table LUT in which the relationship between the analog-to-digital conversion gain and the reference voltage Vload0 (or the reference current Iload0) is defined. Use of the conversion formula or the lookup table LUT makes it possible to precisely control noise injection depending on the analog-to-digital conversion gain without having to use a complicated circuit.

The reference voltage Vload0 (or the reference current Iload0) may be changed continuously with the analog-to-digital conversion gain so that the pulse position is controlled continuously, or the reference voltage Vload0 (or the reference current Iload0) may be changed stepwise so that the pulse position is controlled stepwise, as with the gain-to-adjustment value converter 442 described above.

The reference current source 244 adjusts the read current flowing through the load MOS transistor 242 serving as the current source for supplying the current to the vertical signal line 19 by setting the reference voltage Vload0 (or the reference current Iload0), used in the current generator 245 (not shown in FIG. 18, see FIG. 2), to a value determined by the gain-to-reference value converter 247 depending on the analog-to-digital conversion gain.

This makes it possible to inject noise by reducing the read current supplied from the read current source 24 when the pixel signal is read to the vertical signal line 19 such that the frequency characteristics of the operation of reading the pixel signal are degraded and thus the time needed for the reset noise to settle is intentionally increased, without changing the pixel reset pulse RST supplied to the pixel cell 3 and the comparator reset pulse PSET supplied to the voltage comparator 252. That is, injection of noise is controlled depending on the analog-to-digital conversion gain by controlling the reference voltage Vload0 (or the reference current Iload0) depending on the analog-to-digital conversion gain notified via the communication controller.

Thus, as described above, after the operating point resetting unit 330 starts the operation of eliminating the offset of the voltage comparator 252, the pixel cell 3 is reset by the reset transistor 36 before the offset elimination operation is released, and the offset elimination operation by the operating point resetting unit 330 is released before reset noise occurring in the pixel resetting operation by the reset transistor 36 completely settles.

As a result, reset noise occurring in the resetting operation of the reset transistor 36 serving as the pixel resetting unit in the pixel cell is partially injected as noise which remains without being eliminated by the offset elimination operation performed by the operating point resetting unit (offset eliminating unit) 330 in the voltage comparator 252.

Thus, advantages similar to those obtained in the second or third embodiment are achieved. In particular, it is possible to control the magnitude of injected noise, depending on the analog-to-digital conversion gain.

More specifically, when the slope of the reference signal RAMP is small as with a reference signal RAMP represented by a solid line in FIG. 19 and thus when the analog-to-digital conversion gain is low, the operation is performed such that, to prevent non-randomized quantization errors from occurring, the read current is reduced to increase the reset level stabilizing time Tstb so as to shift the end of the reset level stabilizing time Tstb toward the rising edge of the comparator reset pulse PSET, thereby intentionally injecting reset noise.

On other hand, when the slope of the reference signal RAMP is large as with a reference signal RAMP represented by a broken line in FIG. 19 and thus when the analog-to-digital conversion gain is high, the read current is controlled such that the high reliability of the analog-to-digital conversion has high priority. More specifically, the read current is set to be almost as large as the normal read current value thereby setting the reset level stabilizing time Tstb to be short enough that the analog-to-digital conversion can be performed in a highly reliable fashion, that is, the voltage comparator 252 is turned off by the comparator reset pulse PSET after reset noise has settled enough.

The two states described above are continuously changed by continuously controlling the read current (and thus, the reset level stabilizing time Tstb) depending on the analog-to-digital conversion gain or stepwise changed by stepwise controlling the read current depending on the analog-to-digital conversion gain.

The fourth embodiment described above provides similar advantages to those provided by the technique of controlling the pixel reset pulse RST and the width of the comparator reset pulse PSET (i.e., the reset release interval TRelease). Besides, the fourth embodiment provides an additional advantage that a reduction in the operating current (the read current) of each pixel source follower leads to a reduction in power consumption. However, the low read current value can lead to a limitation on high-speed response, and thus this fourth embodiment is useful in particular for a system in which reading is performed at a rather low speed.

In any of the first to fourth embodiments described above, after temporally constant and two-dimensional spatially random noise is injected into the pixel signal, the reset level and the signal level are converted into digital data, and the difference between them is determined in the digital domain. The injection of such noise results in a reduction in vertical streak noise caused by quantization errors occurring in the difference extraction process performed in the digital domain.

One technique to reduce vertical streak noise is disclosed in "A CMOS Imager with Column-Level ADC Using Dynamic Column FPN Reduction" (SSCC 2006, Session 27, Image Sensors, 27.4). In this technique, a switching matrix is disposed between a pixel array and read circuits disposed in parallel for respective columns, and vertical streak noise is reduced by randomly switching columns.

However, in the technique disclosed in "A CMOS Imager with Column-Level ADC Using Dynamic Column FPN Reduction" (SSCC 2006, Session 27, Image Sensors, 27.4), the vertical streak noise occurring in the pixel array is simply scattered, and no actual reduction in vertical streak noise is achieved. Thus, degradation in image quality caused by the noise is not improved. Besides, columns are switched among up to three or similar number of adjacent columns, and thus the technique is not useful for vertical streak noise with a period longer than three columns.

Japanese Unexamined Patent Application Publication No. 2005-167918 discloses a technique to add pseudo uniform random numbers to a final signal so that fixed vertical streak noise caused by quantization errors is made less conspicuous. However, in this technique, added noise causes degradation in image quality. Besides, additional circuit elements such as a memory used in an averaging process, pseudo uniform random number generator, etc. are necessary.

In contrast, in the technique according to any one of the embodiments of the present invention, before the difference extraction process (corresponding to the CDS process) is performed between the digital data obtained as a result of the analog-to-digital conversion of the signal level and the digital data obtained as a result of the analog-to-digital conversion of the reset level, temporally constant and two-dimensional spatially random noise (in particular, having no column-correlated noise component) is added to the reset level so that quantization errors remaining after the difference extraction process is performed is randomized over two-dimensional space, and the added noise itself is removed via the difference extraction process. Thus, addition of noise does not create degradation in image quality. Furthermore, because noise having no column-correlated noise component is added to the pixel signal before the analog-to-digital conversion process is performed, it is possible to scatter noise with a long period across columns, which is difficult to handle by conventional techniques. Besides, the technique according to any one of the embodiments of the present invention does not need an additional special circuit element such as a random number generator.

In the solid-state image sensor 1 shown in FIG. 1, the difference between the reset level and the signal level is determined digitally in the column processing unit 26 thereby eliminating the variation in the reset level of pixels and also the vertical streak noise. Thus, it is not necessary to perform any process to eliminate vertical streak noise after the difference extraction process is performed.

That is, it is not necessary to additionally dispose special circuit elements such as a separate vertical streak noise reduction circuit or a memory circuit used in an averaging process. Thus, the solid-state image sensor can be realized in a very simple form.

Image Capturing Apparatus

Figure 20:
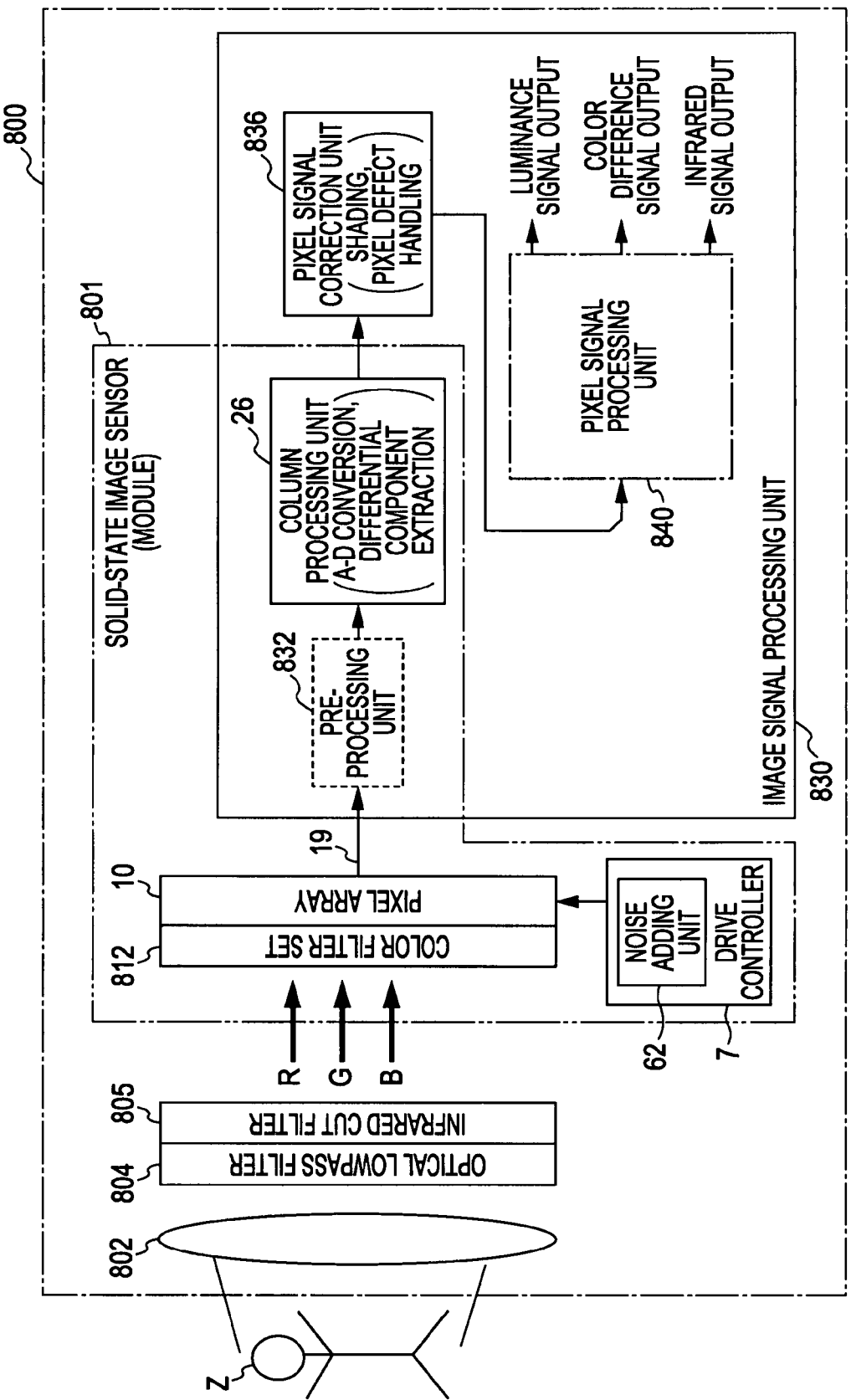
FIG. 20 is a schematic diagram illustrating an image capturing apparatus using a solid-state image sensor.

FIG. 20 is a schematic diagram illustrating an image capturing apparatus using a similar technique to that used in the solid-state image sensor 1 described above. This image capturing apparatus is an example of a physical information acquisition apparatus. By way of example, the image capturing apparatus 800 is configured to capture a visible color image.

The techniques used in the solid-state image sensor 1 described above can also be applied to the image capturing apparatus. That is, in the image capturing apparatus, after temporally constant and two-dimensional spatially random noise is added to a pixel signal, a reference level and a signal level are separately converted into digital data so that the temporally constant and two-dimensional spatially random noise is included in the results of the analog-to-digital conversion. As a result, column-correlated components of noise disappear, and thus no column-correlated noise appears in an image.

More specifically, the image capturing apparatus 800 is configured to include an image-forming lens 802 adapted to focus light L carrying an image of a subject Z on an image sensor unit thereby forming the image of the subject Z on the image sensor unit, an optical lowpass filter 804, a color filter set 812, a pixel array unit 10, a drive controller 7 adapted to drive the pixel array unit 10, and an image signal processing unit 830 adapted to process an image signal output from the pixel array unit 10.

The optical lowpass filter 804 is for preventing aliasing distortion, by blocking high-frequency components with frequencies higher than the Nyquist frequency. As shown in FIG. 20, in addition to the optical lowpass filter 804, an infrared cut filter 805 may be disposed to reduce infrared components, as is widely employed in conventional image capturing apparatuses.

In an image sensing plane of the pixel array unit 10, charges corresponding to visible light carrying an image of a subject Z are generated. The operation associated with accumulation of charges and reading of accumulated charges is controlled by control pulse signals output from a system control circuit (not shown) to the drive controller 7.

The charge signal read from the pixel array unit 10, that is, the visible image signal carrying the visible image of the subject is transmitted to the image signal processing unit 830 and subjected to signal processing.

The image signal processing unit 830 includes a pre-processing unit 832 adapted to perform pre-processing such as black-level adjustment, gain adjustment, gamma adjustment, etc. on the sensor output signal (the visible image signal) output from the pixel array unit 10, a column processing unit 26 having a CDS function and an analog-to-digital conversion function to convert an analog signal output from the pre-processing unit 832 into a digital signal, a pixel signal correction unit 836 adapted to correct shading occurring in the image-forming lens 802 and pixel defects of the pixel array unit 10, an image signal processing unit 840 adapted to generate an image signal in accordance with digital data of signal component Vsig acquired by the column processing unit 26 and corrected by the pixel signal correction unit.

The drive controller 7 includes a noise adding unit 62 adapted to add temporally constant and two-dimensional spatially random noise to the pixel signal transmitted via vertical signal lines 19 of the pixel array unit 10.

In the present example of the image capturing apparatus 800, the pre-processing unit 832 and the column processing unit 26 of the image signal processing unit 830 are disposed in the form of modules separately from the pixel array unit 10. Alternatively, as in the embodiments described above, the pre-processing unit 832 and the column processing unit 26 of the image signal processing unit 830 (and further the communication/timing controller 20 including the noise adding unit 62) may be disposed together with the pixel array unit 10 integrally on the same semiconductor substrate into the form of a single-chip solid-state image sensor 10.

In the example shown in FIG. 20, in addition to the solid-state image sensor 10, the pixel signal correction unit 836, and the image signal processing unit 840, the image capturing apparatus 800 further includes an optical system including the image-forming lens 802, the optical lowpass filter 804, and the infrared cut filter 805. This configuration is advantageous to realize a module having an image capturing function.

For example, the pixel array unit 10 (the image sensor unit), the column processing unit 26 having the analog-to-digital conversion function and the difference extraction process function, a signal processing unit closely associated with the pixel array unit 10 such as the reference signal generator 27 (not shown in FIG. 20) other than the pixel signal correction unit 836 and the image signal processing unit 840, and the noise adding unit 62 using the communication/timing controller 20 are put together into a single package to realize a solid-state image sensor 10 in the form of a module. At a stage following the solid-state image sensor module 10, the remaining signal processing units such as the pixel signal correction unit 836 and the image signal processing unit 840 are disposed to form the image capturing apparatus 800.

Alternatively, the solid-state image sensor module 10, may be configured to include the pixel array unit 10 (image sensor unit) and the optical system including the image-forming lens 802 and the like, and the image capturing apparatus 800 may be configured by adding, to this solid-state image sensor module 10, various signal processing units such as the column processing unit 26, the reference signal generator 27 (not shown in FIG. 20), the pixel signal correction unit 836, and the image signal processing unit 840, and further the noise adding unit 62 using the communication/timing controller 20.

Alternatively, the solid-state image sensor 10 may be configured in the form of a module by putting together in a single package the pixel array unit 10 (image sensor unit), the signal processing unit closely associated with the pixel array unit 10, the noise adding unit 62 using the communication/timing controller 20 and the optical system such as the image-forming lens 802.

The solid-state image sensor module 10 may further include the pixel signal correction unit 836 and the image signal processing unit 840. In this case, there is no difference between the solid-state image sensor 1 and the image capturing apparatus 800.

The image capturing apparatus 800 may be implemented as an apparatus for capturing an image, such as a camera, or as a portable device having a capability of capturing an image. Note that the term "capturing an image" is used herein to widely describe a process of capturing an image such as taking a picture by a camera or the like, detecting fingerprints, etc.

Note that the image capturing apparatus 800 includes all functions of the solid-state image sensor 1 described above. Thus, as with the solid-state image sensor 1 described above, the image capturing apparatus 800 has the feature that substantially no column-correlated noise appears in an image. Furthermore, two-dimensionally spatially random noise injected when the analog-to-digital conversion process is performed in order to suppress column-correlated noise can be removed via the difference extraction process performed in the digital domain by the column processing unit 26, and thus the added noise does not appear in the final image.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image sensor comprising:
   a pixel array unit including a plurality of pixels arranged in an array;
   column signal lines adapted to transmit pixel signals output from pixels in respective columns;
   a noise adding unit adapted to add two-dimensional spatially random noise to the pixel signals transmitted via the column signal lines; and
   an analog-to-digital converter adapted to convert a signal level and a reference level for each pixel signal including the noise added thereto by the noise adding unit, a pixel resetting unit adapted to reset the pixels; and
   an offset eliminating unit adapted to eliminate an offset of the analog-to-digital converter, wherein
   the noise adding unit injects a part of reset noise occurring when the resetting operation is performed by the pixel resetting unit, as noise which remains without being eliminated by the offset elimination operation performed by the offset eliminating unit; and wherein the noise adding unit controls the pixel resetting unit and the offset eliminating unit such that after the offset eliminating unit starts the operation of eliminating the offset of the comparator, the pixel is reset by the pixel resetting unit before the offset elimination operation is released, and the offset elimination operation performed by the offset eliminating unit is released before reset noise occurring in the pixel resetting operation performed by the pixel resetting unit completely settles.

2. The solid-state image sensor according to claim 1, further comprising a difference extractor adapted to acquire digital data of a signal component represented by the difference between the signal level and the reference level, by extracting the difference between the digital data acquired in the analog-to-digital converter as a result of the analog-to-digital conversion of the signal level and the digital data acquired in the analog-to-digital converter as a result of the analog-to-digital conversion of the reference level.

3. The solid-state image sensor according to claim 1, wherein the noise adding unit adds the noise when the reference level is converted into digital data.

4. The solid-state image sensor according to claim 1, wherein
   the analog-to-digital converter includes a comparator adapted to compare the reference level or the signal level of the pixel signal with an analog-to-digital conversion reference signal, and a counter adapted to count the number of clock pulses, whereby the counter performs counting over a period in which the comparator is comparing the reference level or the signal level of the pixel signal with the analog-to-digital conversion reference signal, and digital data of the reference level or the signal level is acquired on the basis of the count value at a point of time at which the comparison process is completed, and
   the offset eliminating unit eliminates the offset of the comparator.

5. The solid-state image sensor according to claim 1, wherein the noise adding unit includes
   a counter adapted to count the number of clock pulses;
   a count value adjustment unit adapted to adjust the count value output from the counter by adding or subtracting an adjustment value, determined depending on a setting value specified from the outside, to or from the count value, and
   a decoder adapted to compare the count value output from the counter and adjusted by the count value adjustment unit with an address value defining the timing of turning on/off pulses, and to generate a control pulse for controlling the pixel resetting operation performed by the pixel resetting unit and a control pulse for controlling the offset elimination operation performed by the offset eliminating unit, in accordance with a result of the comparison.

6. The solid-state image sensor according to claim 1, further comprising a read current source adapted to supply a read current to a column signal line when the pixel signal is read out to the column signal line, wherein
   the noise adding unit controls the offset elimination operation performed by the offset eliminating unit, by adjusting the read current by controlling the read current source such that the offset elimination operation is released before reset noise occurring in the pixel resetting operation performed by the pixel resetting unit completely settles.

* * * * *